(12) United States Patent
Badaye et al.

(10) Patent No.: US 10,534,481 B2
(45) Date of Patent: Jan. 14, 2020

(54) HIGH ASPECT RATIO CAPACITIVE SENSOR PANEL

(71) Applicant: Apple Inc., Cupertino, CA (US)

(72) Inventors: Massoud Badaye, Sunnyvale, CA (US);
Sudip Mondal, Santa Clara, CA (US);
Sagar Rajiv Vaze, Cupertino, CA (US);
Albert Lin, Cupertino, CA (US); Qian Zhao, Santa Clara, CA (US);
Chun-Hao Tung, San Jose, CA (US);
Sunggu Kang, San Jose, CA (US);
John Z. Zhong, Saratoga, CA (US)

(73) Assignee: Apple Inc., Cupertino, CA (US)

(*) Notice: Subject to any disclaimer, the term of this patent is extended or adjusted under 35 U.S.C. 154(b) by 172 days.

(21) Appl. No.: 15/228,942

(22) Filed: Aug. 4, 2016

(65) Prior Publication Data

US 2017/0090622 A1 Mar. 30, 2017

Related U.S. Application Data

(60) Provisional application No. 62/297,771, filed on Feb. 19, 2016, provisional application No. 62/234,871, filed on Sep. 30, 2015.

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04111* (2013.01)

(58) Field of Classification Search
CPC ................... G06F 3/044; G06F 3/0416; G06F 2203/04111
See application file for complete search history.

(56) References Cited

U.S. PATENT DOCUMENTS

| 4,304,976 A | 12/1981 | Gottbreht et al. |
| 4,659,874 A | 4/1987 | Landmeier |

(Continued)

FOREIGN PATENT DOCUMENTS

| CN | 1672119 A | 9/2005 |
| CN | 1711520 A | 12/2005 |

(Continued)

OTHER PUBLICATIONS

Non-Final Office Action dated Dec. 16, 2016, for U.S. Appl. No. 14/645,120, filed Mar. 11, 2015, ten pages.

(Continued)

*Primary Examiner* — Lixi C Simpson
(74) *Attorney, Agent, or Firm* — Kubota & Basol LLP

(57) ABSTRACT

High aspect ratio touch sensor panels are disclosed in which multiple row electrode blocks can be formed in a single row within an active area of the touch sensor panel, each row electrode block including a plurality of vertically adjacent row electrodes, or in some instances only one row electrode. In addition, each column electrode can be separated into multiple column electrode segments, each column electrode segment being vertically oriented and formed in a different column. The column electrode segments associated with any one column electrode can be spread out so that each of these column electrodes segments can be co-located and associated with a different row electrode block.

25 Claims, 14 Drawing Sheets

(56) References Cited

U.S. PATENT DOCUMENTS

| | | |
|---|---|---|
| 5,194,862 A | 3/1993 | Edwards |
| 5,317,919 A | 6/1994 | Awtrey |
| 5,459,463 A | 10/1995 | Gruaz et al. |
| 5,483,261 A | 1/1996 | Yasutake |
| 5,488,204 A | 1/1996 | Mead et al. |
| 5,543,590 A | 8/1996 | Gillespie et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,129,935 B2 | 10/2006 | Mackey |
| 7,138,686 B1 | 11/2006 | Banerjee et al. |
| 7,184,064 B2 | 2/2007 | Zimmerman et al. |
| 7,538,760 B2 | 5/2009 | Hotelling et al. |
| 7,580,030 B2 | 8/2009 | Marten |
| 7,663,607 B2 | 2/2010 | Hotelling et al. |
| 8,120,371 B2 | 2/2012 | Day et al. |
| 8,223,133 B2 | 7/2012 | Hristov |
| 8,319,747 B2 | 11/2012 | Hotelling et al. |
| 8,441,464 B1 | 5/2013 | Lin et al. |
| 8,479,122 B2 | 7/2013 | Hotelling et al. |
| 8,484,838 B2 | 7/2013 | Badaye et al. |
| 8,487,898 B2 | 7/2013 | Hotelling |
| 8,576,193 B2 | 11/2013 | Hotelling |
| 8,593,410 B2 | 11/2013 | Hong |
| 8,593,425 B2 | 11/2013 | Hong et al. |
| 8,633,915 B2 | 1/2014 | Hotelling et al. |
| 8,680,877 B2 | 3/2014 | Lee et al. |
| 8,982,096 B2 | 3/2015 | Hong et al. |
| 9,280,251 B2 | 3/2016 | Shih |
| 9,317,165 B2 | 4/2016 | Hotelling et al. |
| 10,001,888 B2 | 6/2018 | Hong et al. |
| 2004/0017362 A1 | 1/2004 | Mulligan et al. |
| 2004/0090429 A1 | 5/2004 | Geaghan et al. |
| 2004/0239650 A1 | 12/2004 | Mackey |
| 2005/0073507 A1 | 4/2005 | Richter et al. |
| 2005/0083307 A1 | 4/2005 | Aufderheide et al. |
| 2005/0146509 A1 | 7/2005 | Geaghan et al. |
| 2005/0270039 A1 | 12/2005 | Mackey |
| 2005/0270273 A1 | 12/2005 | Marten |
| 2005/0280639 A1 | 12/2005 | Taylor et al. |
| 2006/0038791 A1 | 2/2006 | Mackey |
| 2006/0132463 A1 | 6/2006 | Lee et al. |
| 2006/0146484 A1 | 7/2006 | Kim et al. |
| 2006/0197753 A1 | 9/2006 | Hotelling |
| 2007/0008299 A1 | 1/2007 | Hristov |
| 2007/0074914 A1 | 4/2007 | Geaghan et al. |
| 2007/0229468 A1 | 10/2007 | Peng et al. |
| 2007/0247443 A1 | 10/2007 | Philipp |
| 2007/0279395 A1 | 12/2007 | Philipp |
| 2008/0074398 A1 | 3/2008 | Wright |
| 2008/0136787 A1 | 6/2008 | Yeh et al. |
| 2008/0158167 A1 | 7/2008 | Hotelling et al. |
| 2008/0158181 A1 | 7/2008 | Hamblin et al. |
| 2008/0264699 A1 | 10/2008 | Chang et al. |
| 2008/0277259 A1 | 11/2008 | Chang |
| 2008/0309633 A1 | 12/2008 | Hotelling et al. |
| 2008/0309635 A1 | 12/2008 | Matsuo |
| 2009/0002337 A1 | 1/2009 | Chang |
| 2009/0019344 A1 | 1/2009 | Yoon et al. |
| 2009/0054107 A1 | 2/2009 | Feland et al. |
| 2009/0091551 A1 | 4/2009 | Hotelling et al. |
| 2009/0182189 A1 | 7/2009 | Lira |
| 2009/0194344 A1 | 8/2009 | Harley et al. |
| 2009/0236151 A1 | 9/2009 | Yeh et al. |
| 2009/0242283 A1 | 10/2009 | Chiu |
| 2009/0267902 A1 | 10/2009 | Nambu et al. |
| 2009/0303189 A1 | 12/2009 | Grunthaner et al. |
| 2009/0309850 A1 | 12/2009 | Yang |
| 2009/0314621 A1 | 12/2009 | Hotelling |
| 2009/0315854 A1 | 12/2009 | Matsuo |
| 2010/0001973 A1* | 1/2010 | Hotelling ............ G02F 1/13338 345/174 |
| 2010/0059294 A1 | 3/2010 | Elias et al. |
| 2010/0079384 A1 | 4/2010 | Grivna |
| 2010/0149108 A1 | 6/2010 | Hotelling et al. |
| 2010/0328228 A1 | 12/2010 | Elias |
| 2010/0328248 A1 | 12/2010 | Mozdzyn |
| 2011/0007020 A1 | 1/2011 | Hong |
| 2011/0175846 A1 | 7/2011 | Wang et al. |
| 2012/0169652 A1 | 7/2012 | Chang |
| 2012/0169653 A1 | 7/2012 | Chang |
| 2012/0169655 A1 | 7/2012 | Chang |
| 2012/0169656 A1 | 7/2012 | Chang |
| 2012/0249446 A1* | 10/2012 | Chen ....................... G06F 3/044 345/173 |
| 2013/0100038 A1 | 4/2013 | Yilmaz et al. |
| 2013/0120303 A1 | 5/2013 | Hong et al. |
| 2013/0224370 A1 | 8/2013 | Cok et al. |
| 2013/0257798 A1 | 10/2013 | Tamura et al. |
| 2014/0022186 A1 | 1/2014 | Hong et al. |
| 2014/0111707 A1 | 4/2014 | Song et al. |
| 2014/0160376 A1 | 6/2014 | Wang et al. |
| 2014/0192027 A1* | 7/2014 | Ksondzyk .............. G01N 27/22 345/178 |
| 2014/0204043 A1 | 7/2014 | Lin et al. |
| 2014/0210784 A1* | 7/2014 | Gourevitch .......... H03K 17/962 345/174 |
| 2014/0267128 A1 | 9/2014 | Bulea et al. |
| 2014/0354301 A1 | 12/2014 | Trend |
| 2015/0227240 A1 | 8/2015 | Hong et al. |
| 2016/0195954 A1 | 7/2016 | Wang et al. |
| 2017/0060318 A1* | 3/2017 | Gu ........................ G06F 3/0416 |

FOREIGN PATENT DOCUMENTS

| | | |
|---|---|---|
| CN | 1782837 A | 6/2006 |
| CN | 1818842 A | 8/2006 |
| CN | 1864124 A | 11/2006 |
| CN | 1945516 A | 4/2007 |
| CN | 101046720 A | 10/2007 |
| CN | 101071354 A | 11/2007 |
| CN | 103 365 500 A | 10/2013 |
| DE | 11 2008 001 245 T5 | 3/2010 |
| DE | 10 2011 089693 A1 | 6/2013 |
| EP | 0 853 230 A1 | 7/1998 |
| EP | 1 573 706 A2 | 2/2004 |
| EP | 1 644 918 A2 | 12/2004 |
| EP | 1 644 918 A3 | 12/2004 |
| EP | 1 192 585 A1 | 12/2005 |
| EP | 1 192 585 B1 | 12/2005 |
| EP | 1 918 803 A1 | 5/2008 |
| EP | 2 077 489 A1 | 7/2009 |
| GB | 1 546 317 A | 5/1979 |
| GB | 2 144 146 A | 2/1985 |
| GB | 2 428 306 A | 1/2007 |
| GB | 2 437 827 A | 11/2007 |
| JP | 2000-163031 A | 6/2000 |
| JP | 2002-342033 A | 11/2002 |
| JP | 2004-503835 A | 2/2004 |
| JP | 2005-030901 A | 2/2005 |
| JP | 2005-084128 A | 3/2005 |
| JP | 2007-018515 A | 1/2007 |
| JP | 3134925 U | 8/2007 |
| JP | 2008-510251 A | 4/2008 |
| TW | M344522 | 11/2008 |
| TW | M344544 | 11/2008 |
| WO | WO-01/097204 A1 | 12/2001 |
| WO | WO-02/080637 A1 | 10/2002 |
| WO | WO-2005/114369 A2 | 12/2005 |
| WO | WO-2006/023147 A2 | 3/2006 |
| WO | WO-2006/023147 A3 | 3/2006 |
| WO | WO-2006/104745 A2 | 10/2006 |
| WO | WO-2006/104745 A3 | 10/2006 |
| WO | WO-2006/130584 A2 | 12/2006 |
| WO | WO-2006/130584 A3 | 12/2006 |
| WO | WO-2007/034591 A1 | 3/2007 |
| WO | WO-2007/054018 A1 | 5/2007 |
| WO | WO-2007/146785 A2 | 12/2007 |

(56) References Cited

FOREIGN PATENT DOCUMENTS

| WO | WO-2007/146785 A3 | 12/2007 |
|---|---|---|
| WO | WO-2008/007118 A2 | 1/2008 |
| WO | WO-2008/007118 A3 | 1/2008 |
| WO | WO-2008/108514 A1 | 9/2008 |
| WO | WO-2008/135713 A1 | 11/2008 |
| WO | WO-2009/046363 A1 | 4/2009 |
| WO | WO-2009/132146 A1 | 10/2009 |
| WO | WO-2009/132150 A1 | 10/2009 |
| WO | WO-2010/117882 A2 | 10/2010 |
| WO | WO-2014/105942 A1 | 7/2014 |

OTHER PUBLICATIONS

Cassidy, R. (Feb. 23, 2007). "The Tissot T-Touch Watch—A Groundbreaking Timepiece," located at <http://ezinearticles.com/?The-Tissot-T-Touch-Watch---A-Groundbreaking-Timepiece&id . . . >, last visited Jan. 23, 2009, two pages.

Chinese Search Report dated Jan. 7, 2011, for CN Application No. 2009200081997, filed Apr. 24, 2009, with English Translation, 14 pages.

Chinese Search Report dated Jan. 10, 2011, for CN Application No. 2008201338142, filed Sep. 27, 2008, with English Translation, 25 pages.

Chinese Search Report completed Jun. 3, 2011, for CN Patent Application No. ZL2009201524013, with English Translation, 20 pages.

Chinese Search Report dated Nov. 3, 2015, for CN Patent Application No. 201310330348.2 with English Translation, 4 pages.

European Search Report dated Mar. 19, 2009, for EP Application No. 08017396.6, filed Oct. 8, 2008, seven pages.

Final Office Action dated Jun. 8, 2011, for U.S. Appl. No. 12/038,760, filed Feb. 27, 2008, 20 pages.

Final Office Action dated Dec. 15, 2011, for U.S. Appl. No. 12/333,250, filed Dec. 11, 2008, 12 pages.

Final Office Action dated Jan. 19, 2012, for U.S. Appl. No. 12/110,024, filed Apr. 25, 2008, 12 pages.

Final Office Action dated Aug. 31, 2012, for U.S. Appl. No. 12/110,075, filed Apr. 25, 2008, 15 pages.

Final Office Action dated Dec. 24, 2012, for U.S. Appl. No. 12/110,024, filed Apr. 25, 2008, 21 pages.

Final Office Action dated Feb. 5, 2013, for U.S. Appl. No. 12/500,911, filed Jul. 10, 2009, 15 pages.

Final Office Action dated Jul. 23, 2013, for U.S. Appl. No. 12,038,760, filed Feb. 27, 2008, 20 pages.

Final Office Action dated Aug. 31, 2015, for U.S. Appl. No. 14/157,737, filed Jan. 17, 2014, 27 pages.

Final Office Action dated May 27, 2016, for U.S. Appl. No. 14/645,120, filed Mar. 11, 2015, twelve pages.

Great Britain Search Report dated Jan. 16, 2009, for GB Application No. GB0817242.1, filed Sep. 22, 2008, two pages.

Great Britain Search Report dated Jan. 19, 2010, for GB Application No. GB0817242.1, filed Sep. 22, 2008, two pages.

International Search Report dated Mar. 19, 2009, for PCT Application No. PCT/US2008/078836, filed on Oct. 3, 2008, four pages.

International Search Report dated Jul. 17, 2009, for PCT Application No. PCT/US2009/041460, three pages.

International Search Report dated Aug. 5, 2009, for PCT Application No. PCT/US2009/041465, filed Apr. 22, 2009, four pages.

International Search Report dated Jan. 14, 2011, for PCT Application No. PCT/US2010/029698, filed Apr. 1, 2010, 5 pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action dated Feb. 4, 2011, for U.S. Appl. No. 12/038,760, filed Feb. 27, 2008, 18 pages.

Non-Final Office Action dated Jul. 8, 2011, for U.S. Appl. No. 12/110,075, filed Apr. 25, 2008, 14 pages.

Non-Final Office Action dated Jul. 11, 2011, for U.S. Appl. No. 12/110,024, filed Apr. 25, 2008, 12 pages.

Non-Final Office Action dated Aug. 17, 2011, for U.S. Appl. No. 12/333,250, filed Dec. 11, 2008, 12 pages.

Non-Final Office Action dated Jan. 25, 2012, for U.S. Appl. No. 12/110,075, filed Apr. 25, 2008, 21 pages.

Non-Final Office Action dated Jun. 7, 2012, for U.S. Appl. No. 12/500,911, filed Jul. 10, 2009, 16 pages.

Non-Final Office Action dated Jul. 3, 2012, for U.S. Appl. No. 12/110,024, filed Apr. 25, 2008, 19 pages.

Non-Final Office Action dated Jan. 2, 2013, for U.S. Appl. No. 12/038,760, filed Feb. 27, 2008, 20 pages.

Non-Final Office Action dated Mar. 28, 2013, for U.S. Appl. No. 12/110,075, filed Apr. 25, 2008, 14 pages.

Non-Final Office Action dated Mar. 29, 2013 for U.S. Appl. No. 13/737,779, filed Jan. 9, 2013, nine pages.

Non-Final Office Action dated Apr. 10, 2014, for U.S. Appl. No. 14/055,717, filed Oct. 16, 2013, 10 pages.

Non-Final Office Action dated Feb. 10, 2015, for U.S. Appl. No. 14/157,737, filed Jan. 17, 2014, 23 pages.

Non-Final Office Action dated Oct. 27, 2015, for U.S. Appl. No. 14/645,120, filed Mar. 11, 2015, eight pages.

Notice of Allowance dated Aug. 28, 2012, for U.S. Appl. No. 12/333,250, filed Dec. 11, 2008, nine pages.

Notice of Allowance dated May 23, 2013, for U.S. Appl. No. 12/110,024, filed Apr. 25, 2008, five pages.

Notice of Allowance dated Aug. 19, 2013, for U.S. Appl. No. 12/110,075, filed Apr. 25, 2008, eight pages.

Notice of Allowance dated Aug. 19, 2013, for U.S. Appl. No. 12/500,911, filed Jul. 10, 2009, six pages.

Notice of Allowance dated Sep. 3, 2013, for U.S. Appl. No. 13/737,779, filed Jan. 9, 2013, 10 pages.

Notice of Allowance dated Nov. 8, 2013, for U.S. Appl. No. 12,038,760, filed Feb. 27, 2008, 15 pages.

Notice of Allowance dated Nov. 7, 2014, for U.S. Appl. No. 14/055,717, filed Oct. 16, 2013, six pages.

Notice of Allowance dated Nov. 2, 2015, for U.S. Appl. No. 14/329,719, filed Jul. 11, 2014, eight pages.

Notice of Allowance dated Dec. 14, 2015, for U.S. Appl. No. 14/157,737, filed Jan. 17, 2014, five pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

International Search Report dated Oct. 31, 2016, for PCT Application No. PCT/US2016/048694, filed Aug. 25, 2016, six pages.

Final Office Action dated Aug. 10, 2017, for U.S. Appl. No. 14/645,120, filed Mar. 11, 2015, twelve pages.

Non-Final Office Action dated Nov. 3, 2017, for U.S. Appl. No. 15/090,555, filed Apr. 4, 2016, 27 pages.

Notice of Allowance dated Mar. 1, 2018, for U.S. Appl. No. 14/645,120, filed Mar. 11, 2015, five pages.

Final Office Action dated Aug. 29, 2018, for U.S. Appl. No. 15/090,555, filed Apr. 4, 2016, 17 pages.

Notice of Allowance dated Feb. 12, 2019, for U.S. Appl. No. 15/090,555, filed Apr. 4, 2016, seven pages.

* cited by examiner

HIGH ASPECT RATIO CAPACITIVE
SENSOR PANEL

CROSS-REFERENCE TO RELATED APPLICATIONS

This application is a Non-Provisional application which claims the benefit of U.S. Provisional Patent Application No. 62/297,771, filed Feb. 19, 2016, and U.S. Provisional Patent Application No. 62/234,871, filed Sep. 30, 2015 the contents of which are incorporated herein by reference in their entirety for all purposes.

FIELD OF THE DISCLOSURE

This relates generally to touch sensing, and more particularly, to a high aspect ratio capacitive touch sensor panel.

BACKGROUND OF THE DISCLOSURE

Touch sensitive devices have become popular as input devices to computing systems due to their ease and versatility of operation as well as their declining price. A touch sensitive device can include a touch screen formed from a transparent touch sensor panel and a display device. The display device, such as a liquid crystal display (LCD), can be positioned partially or fully behind the touch sensor panel or integrated with the touch sensor panel so that a touch sensitive surface of the touch sensor panel can cover at least a portion of the viewable area of the display device. The touch sensitive device can allow a user to perform various functions using a finger, stylus, or other object to touch or hover over the touch sensor panel at a location often dictated by a user interface (UI) being displayed by the display device. In general, the touch sensitive device can recognize a touch or proximity (hover) event and the position of the event on the touch sensor panel, and the computing system can then interpret the event in accordance with the display appearing at the time of the event, and thereafter can perform one or more actions based on the event.

Touch sensor panels can be designed to provide the largest active area (touch sensitive area, or touch sensitive display area when used in touch screens) practical, and to provide the clearest display practical when used in touch screens (i.e., provide a display experience that minimizes optical artifacts caused by touch sensor panel structures). Accordingly, narrow bezels surrounding a touch screen can be advantageous because they can increase touch screen real estate and keep devices compact. In addition, routing touch sensor panel electrodes to border areas and making necessary connections and crossovers outside of the active area can be advantageous to reduce the number of layers, dissimilar materials, and crossovers of those dissimilar materials in the active area and increase optical uniformity.

Although touch screens with conventional aspect ratios have become commonplace as the main input mechanism for many handheld devices, utilizing touch screens in other areas of the device, such as those areas requiring a high aspect ratio (e.g., where the touch screen length is much larger than the width), can present challenges to the goals of maximizing touch screen real estate and display clarity. For example, long, thin touch screens with high aspect ratios can result in numerous long routing traces being formed outside the active area of the touch screen, creating wide, undesirable bezels and limiting the amount of real estate available for the touch screen. To counteract the formation of wide bezels, the routing traces can be made thinner, but narrower trace widths and spacing can require higher process accuracy and uniformity control, which can increase processing complexity and cost. Furthermore, narrow traces widths and spacing can cause high trace line resistances, larger cross-coupling, and the like. In addition, high aspect ratio touch sensor panels can present issues for structures within the active area. For example, high aspect ratio touch screens can require long lengths of conductive material within the active area, and can contain layers, materials and structures that can lead to increased panel thickness, physical defects, manufacturing process steps/time, cost, parasitic capacitance, and structural failures during operation, and also to degraded touch sensing performance and optical uniformity.

SUMMARY OF THE DISCLOSURE

Examples of the disclosure are directed to touch sensor panels capable of being used in touch screens, including but not limited to high-aspect ratio touch screens. Instead of each row electrode being formed in a different row in the touch sensor panel, in some examples of the disclosure multiple row electrode blocks can be formed in a single row within an active area of the touch sensor panel, wherein each row electrode block can contain a plurality of vertically adjacent row electrodes, or in some instances only one row electrode. This arrangement of horizontally arranged row electrode blocks can result in fewer rows of row electrodes. In addition, instead of each column electrode being continuously formed as a single column, in some examples of the disclosure each column electrode can be separated into multiple column electrode segments, each column electrode segment being vertically oriented and formed in a different column, resulting in more columns of column electrode segments. The column electrode segments associated with any one column electrode can be distributed so that each of these column electrodes segments can be associated with a different row electrode block.

To reduce the number of routing traces, some examples of the disclosure utilize bus line sharing to electrically couple multiple column electrode segments to a single routing trace. The reduction in the number of rows and the increase in the number of columns that can result from the use of horizontally arranged row electrode blocks and column electrode segments can produce a smaller touch sensor panel vertical dimension and a longer horizontal dimension, enabling higher aspect ratios. Furthermore, the use of bus line sharing to reduce the number of routing traces can produce a smaller bezel width if these traces are routed outside the active area of the touch sensor panel, which can increase the amount of real estate available to the touch sensor panel. In some examples, the bus lines can be distributed symmetrically about the active area to distribute the bezel area symmetrically. Additionally or alternatively, the reduction in the number of routing traces outside the active area due to the use of bus line sharing can enable wider ground traces to be used between the routing traces and the active area, which can reduce touch signal to noise ratios (SNR) and reduce touch error.

As mentioned above, in some examples of the disclosure, routing traces can be routed outside the active area of the touch sensor panel. To enable routing traces to be formed primarily or entirely outside of the active area, in some examples the row electrodes and column electrode segments within the active area can extend to the edge of the active area. In some examples, the row electrodes can be generally comb-shaped, with a shaft (backbone) running the length of the row electrode and teeth extending from the shaft. A plurality of column electrode segments can also be formed on the same layer as the one or more row electrodes. In some examples, the column electrode segments can be further separated into patches that can be located at least partially between the teeth of the row electrodes. These patches can also extend to the edge of the active area and be coupled using routing traces formed primarily or entirely outside of the active area. In some examples, a row electrode can be formed from row electrode patches. The row electrode patches can extend outside of the active area and be coupled together to a common routing trace (e.g., by a via). Column electrode segments can also be formed on the same layer as the row electrode patches. The column electrode segments can also extend outside the active area and be coupled to routing traces outside of the active area (e.g., by a via).

Although examples of the disclosure may be described herein in terms of rows and columns, or in terms of horizontal and vertical orientations, these terms are relative terms understood in the context of the orientations shown in the corresponding figures, and do not define absolute orientations.

DETAILED DESCRIPTION

Figure 1A:
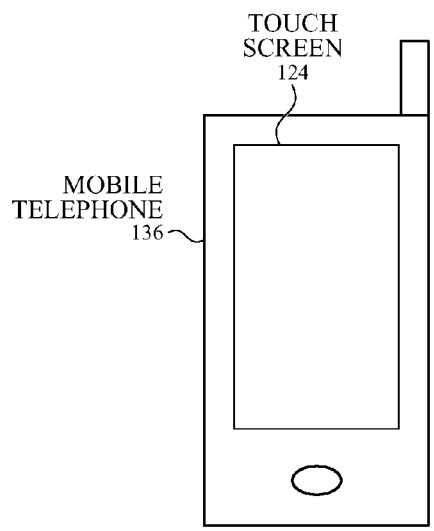
FIGS. 1A-1D illustrate example systems in which a high aspect ratio touch screen according to examples of the disclosure may be implemented.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Examples of the disclosure are directed to touch sensor panels capable of being used in touch screens, including but not limited to high-aspect ratio touch screens. Instead of each row electrode being formed in a different row in the touch sensor panel, in some examples of the disclosure multiple row electrode blocks can be formed in a single row within an active area of the touch sensor panel, wherein each row electrode block can contain a plurality of vertically adjacent row electrodes, or in some instances only one row electrode. This arrangement of horizontally arranged row electrode blocks can result in fewer rows (i.e., fewer sets) of row electrodes. In addition, instead of each column electrode being continuously formed as a single column, in some examples of the disclosure each column electrode can be separated into multiple column electrode segments, each column electrode segment being vertically oriented and formed in a different column, resulting in more columns of column electrode segments. The column electrode segments associated with any one column electrode can be distributed so that each of these column electrodes segments can be associated with a different row electrode block.

To reduce the number of routing traces, some examples of the disclosure utilize bus line sharing to electrically couple multiple column electrode segments to a single routing trace. The reduction in the number of rows and the increase in the number of columns that can result from the use of horizontally arranged row electrode blocks and column electrode segments can produce a smaller touch sensor panel vertical dimension and a longer horizontal dimension, enabling higher aspect ratios. Furthermore, the use of bus line sharing to reduce the number of routing traces can produce a smaller bezel width if these traces are routed outside the active area of the touch sensor panel, which can increase the amount of real estate available to the touch sensor panel. In some examples, the bus lines can be distributed symmetrically about the active area to distribute the bezel area symmetrically. Additionally or alternatively, the reduction in the number of routing traces outside the active area due to the use of bus line sharing can enable wider ground traces to be used between the routing traces and the active area, which can reduce touch signal to noise ratios (SNR) and reduce touch error.

As mentioned above, in some examples of the disclosure, routing traces can be routed outside the active area of the touch sensor panel. To enable routing traces to be formed primarily or entirely outside of the active area, in some examples the row electrodes and column electrode segments within the active area can extend to the edge of the active area. In some examples, the row electrodes can be generally comb-shaped, with a shaft (backbone) running the length of the row electrode and teeth extending from the shaft. A plurality of column electrode segments can also be formed on the same layer as the one or more row electrodes. In some examples, the column electrode segments can be further separated into patches that can be located at least partially between the teeth of the row electrodes. These patches can also extend to the edge of the active area and be coupled using routing traces formed primarily or entirely outside of the active area. In some examples, a row electrode can be formed from row electrode patches. The row electrode patches can extend outside of the active area and be coupled together to a common routing trace (e.g., by a via). Column electrode segments can also be formed on the same layer as the row electrode patches. The column electrode segments can also extend outside the active area and be coupled to routing traces outside of the active area (e.g., by a via).

The coupling and routing of the row electrodes and column electrode segment patches outside the active area of the touch sensor panel can eliminate or reduce the need for additional layers within the active area for bridges and insulation, and can eliminate or reduce the need for necked-down areas (areas where the width of the conductive material narrows down) within the row and column electrodes. In addition, the row electrodes and column electrode segments can be shaped to form a uniform, regular, and repeating pattern on a single conductive layer. With this arrangement, touch sensor panels according to examples of the disclosure can reduce panel thickness, physical defects, manufacturing process steps/time, cost, parasitic capacitance, and structural failures during operation, while improving touch or proximity sensing performance and enhancing optical uniformity when used as part of a touch screen.

In other examples of the disclosure, the same layer of conductive material that forms the row electrodes and the column electrode segment patches can extend outside the active area of the touch sensor panel and under the routing traces outside the active area. The routing traces can then be coupled to the extended row electrodes and column electrode segment patches using vias located outside the active area.

In other examples of the disclosure, the column electrode segment patches in a single column can be coupled together using a bridge and an insulator on different layers within the active area of the touch sensor panel to enable the column electrode segments to cross over the row electrodes. These examples can simplify the coupling and crossovers of the routing traces outside of the active area.

Figure 1B:
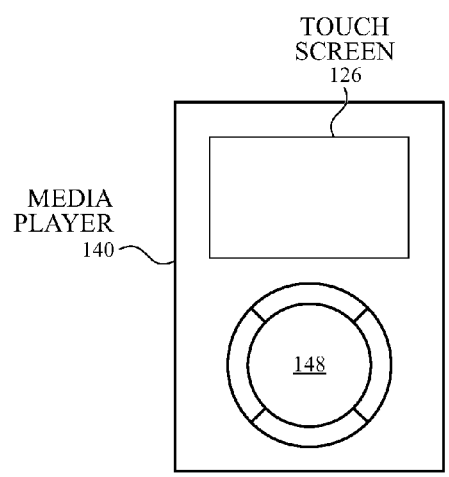
Figure 1C:
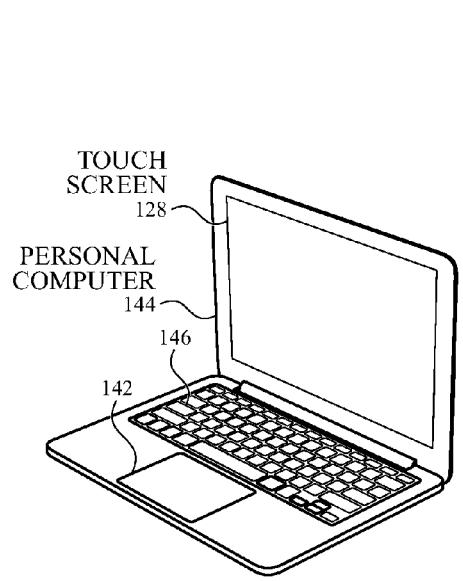
Figure 1D:
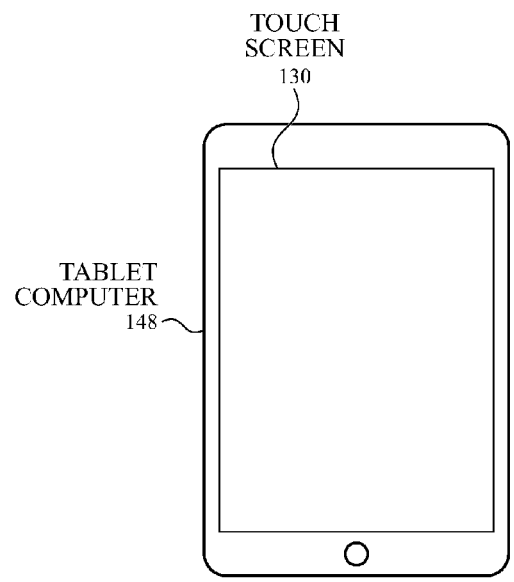

FIGS. 1A-1D illustrate example systems in which a high aspect ratio touch screen according to examples of the disclosure may be implemented. FIG. 1A illustrates an example mobile telephone 136 that includes a touch screen 124. In some examples of FIG. 1A, a high aspect ratio touch screen according to examples of the disclosure can be located adjacent to or near touch screen 124 on the front, side or back surfaces of the mobile telephone 136, or be part of the touch screen. FIG. 1B illustrates an example digital media player 140 that includes a touch screen 126. In some examples of FIG. 1B, a high aspect ratio touch screen according to examples of the disclosure can be located adjacent to or near touch screen 126 on the front of the media player 140, on the side or back surfaces of the media player, or be part of the touch screen. The high aspect ratio touch screen according to examples of the disclosure can alternatively or additionally be located adjacent to or near to a scroll wheel 148 on the front of the media player 140, or be part of the scroll wheel. FIG. 1C illustrates an example personal computer 144 that includes a touch screen 128. In some examples of FIG. 1C, a high aspect ratio touch screen according to examples of the disclosure can be located adjacent to or near touch screen 128, trackpad 142 or keyboard 146, can be located on the side or back surfaces of the personal computer 144, or can be a part of the keyboard (e.g., a virtual keyboard portion) or touch screen. FIG. 1D illustrates an example tablet computer 148 that includes a touch screen 130. In some examples of FIG. 1D, a high aspect ratio touch screen according to examples of the disclosure can be located adjacent to or near touch screen 130 on the front, side or back surfaces of the tablet computer 148, or be part of the touch screen. It is understood that touch screens according to examples of the disclosure can be implemented in other devices as well, including wearable devices and styli.

The high aspect ratio touch screen according to examples of the disclosure can be based on mutual capacitance. A mutual capacitance based touch system can include drive and sense lines that may cross over each other on different layers, or may be adjacent to each other on the same layer. The crossing or adjacent locations can be referred to as touch nodes or touch pixels. During operation, the drive lines can be stimulated with an AC waveform and the mutual capacitance of the touch nodes can be measured. As an object approaches a touch node, the mutual capacitance of the touch node can change. This change in the mutual capacitance of the touch node can be detected and measured by the touch sensing system to determine the positions of multiple objects when they touch, or come in proximity to, the touch screen.

In some examples, the high aspect ratio touch screen according to examples of the disclosure can be based on self-capacitance. A self-capacitance based touch system can include a matrix of small, individual plates of conductive material that can be referred to as touch node or touch pixel electrodes. For example, a touch screen can include a plurality of individual touch node electrodes, each touch node electrode identifying or representing a unique location on the touch screen at which touch or proximity (i.e., a touch or proximity event) is to be sensed, and each touch node electrode being electrically isolated from the other touch node electrodes in the touch screen/panel. Such a touch screen can be referred to as a pixelated touch screen. During self-capacitance sensing operation, a touch pixel electrode can be stimulated with an AC waveform, and the self-capacitance to ground of the touch pixel electrode can be measured. As an object approaches the touch pixel electrode, the self-capacitance to ground of the touch pixel electrode can change. This change in the self-capacitance of the touch pixel electrode can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

Figure 2:
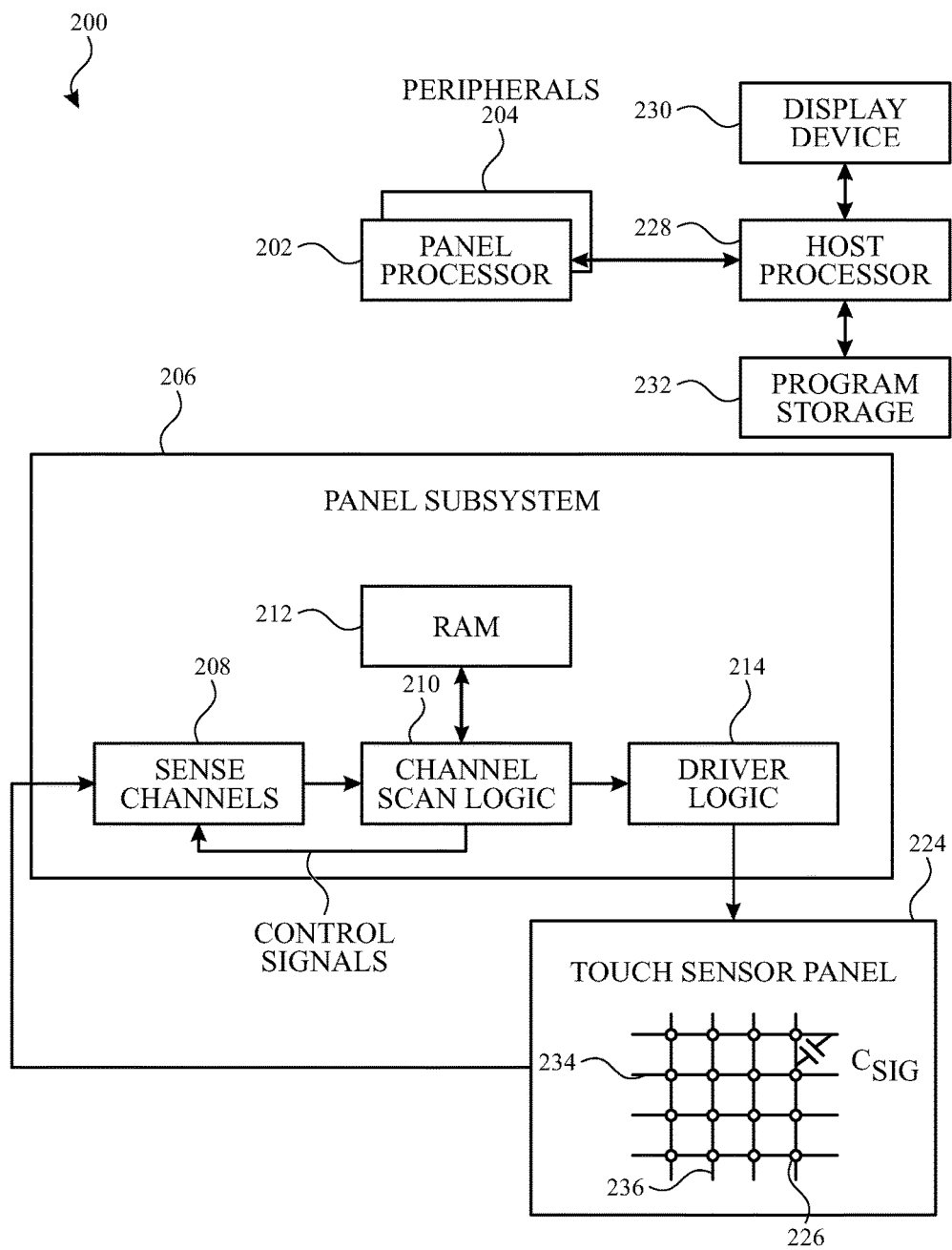
FIG. 2 illustrates an exemplary computing system including a capacitive touch sensor panel according to examples of the disclosure.

FIG. 2 illustrates an exemplary computing system 200 including a capacitive touch sensor panel 224 according to examples of the disclosure. Computing system 200 can include one or more panel processors 202, peripherals 204, and panel subsystem 206. Peripherals 204 can include, but are not limited to, random access memory (RAM) or other types of memory or storage, watchdog timers and the like. Panel subsystem 206 can include, but is not limited to, one or more sense channels 208, channel scan logic (analog or digital) 210 and driver logic (analog or digital) 214. Touch sensor panel 224 can include row electrodes 234 and column electrodes 236. In mutual capacitance touch sensor panel examples, stimulation signals from driver logic 214 can be driven onto row electrodes 234, and sense signals on column electrodes 236 can be sensed by sense channels 208. Touch or proximity events can alter the capacitive coupling Csig between row electrodes 234 and column electrodes 236 at touch nodes 226 and cause a change to the sense signals on column electrodes 236. However, in self-capacitance touch sensor panel examples, driver logic and sense channel blocks 214 and 208 can be combined, and the touch sensor panel can be driven and sensed on both row electrodes 234 and column electrodes 236. Channel scan logic 210 can access RAM 212, autonomously read data from sense channels 208 and provide control for the sense channels. In addition, channel scan logic 210 can control driver logic 214 to generate stimulation signals that can be sequentially or simultaneously applied to the row electrodes 234 of touch sensor panel 224. In some examples, panel subsystem 206, panel processor 202 and peripherals 204 can be integrated into a single application specific integrated circuit (ASIC) that can be referred to herein as a touch controller.

In mutual capacitance sensing examples, touch sensor panel 224 can include a capacitive sensing medium having one or more drive electrodes and one or more sense electrodes. The drive and sense electrodes can be formed from a transparent conductive medium such as Indium Tin Oxide (ITO) or Antimony Tin Oxide (ATO), although other transparent and non-transparent materials such as copper can also be used. The drive and sense electrodes can be formed on a single side of a transparent substrate. Each adjacency of drive and sense electrodes can represent a capacitive sensing node and can be viewed as touch picture element (touch pixel) or touch node 226, which can be particularly useful when touch sensor panel 224 is viewed as capturing an "image" of touch or proximity. (In other words, after panel subsystem 206 has determined whether a touch or proximity event has been detected at each sense electrode in the touch sensor panel, the pattern of sense electrodes in the touch sensor panel at which a touch or proximity event occurred can be viewed as an "image" of touch or proximity (e.g., a pattern of fingers touching or hovering over the panel).) The capacitance between the drive and sense electrodes and local system ground can appear as a stray capacitance Cstray, and the capacitance at the intersections of the drive and sense electrodes, i.e., the touch nodes, can appear as a mutual signal capacitance Csig between the drive and sense electrodes when the given drive electrode is stimulated with an alternating current (AC) signal. The presence of a finger or other object (such as a stylus) near or on the touch sensor panel can be detected by measuring changes to a signal charge present at the nodes being touched, which can be a function of Csig. Each sense electrode of touch sensor panel 224 can be coupled to a sense channel 208 in panel subsystem 206. Touch sensor panel 224 can cover a portion or all of a surface of a device.

In self-capacitance sensing examples, touch sensor panel 224 can include a capacitive sensing medium having a plurality of sense electrodes. The sense electrodes can be formed from a transparent conductive medium such as ITO or ATO, although other transparent and non-transparent materials such as copper can also be used. The sense electrodes can be formed on a single side of a transparent substrate. In some examples, the sense electrodes can be viewed as touch picture element (touch pixel) or touch node 226, which can be particularly useful when touch sensor panel 224 is viewed as capturing an "image" of touch or proximity. The capacitance between the sense electrodes and system ground can represent the self-capacitance of those electrodes. The presence of a finger or other object (such as a stylus) near or on the touch sensor panel can be detected by measuring changes to the self-capacitance of nearby sense electrodes. Each sense electrode of touch sensor panel 224 can be coupled to a sense channel 208 in panel subsystem 206. Touch sensor panel 224 can cover a portion or all of a surface of a device.

Computing system 200 can also include host processor 228 for receiving outputs from panel processor 202 and performing actions based on the outputs that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to panel processing, and can be coupled to program storage 232 and display device 230 such as an LCD display for providing a UI to a user of the device. Display device 230 together with touch sensor panel 224, when located partially or entirely under the touch sensor panel, can form a touch screen.

In some examples, touch sensor panel 224 and display device 230 together can form an integrated touch screen in which touch sensing circuit elements of the touch sensing system (e.g., sense electrodes) can be integrated into the display pixel stackups of display device 230. The circuit elements in an integrated touch screen can include, for example, elements that can exist in LCD or other displays, such as one or more display pixel transistors (e.g., thin film transistors (TFTs)), gate lines, data lines, pixel electrodes and common electrodes. It is noted that circuit elements are not limited to whole circuit components, such as a whole capacitor, a whole transistor, etc., but can include portions of circuitry, such as only one of the two plates of a parallel plate capacitor. In some configurations, each common electrode in an integrated touch screen can serve as a multi-function circuit element that can operate as display circuitry of the display system of the touch screen and can also operate as elements of the touch circuitry of the touch sensing system. Specifically, each common electrode can operate as a common electrode of the display circuitry of the touch screen (e.g., during a display phase), and can also operate as a common electrode (i.e., a sense electrode) of the touch circuitry of the touch screen (e.g., during a touch sensing phase). It should be understood that a display phase and a touch sensing phase of an integrated touch screen may be operated at the same time, e.g., partially or completely overlapping, or the display phase and touch sensing phase may operate at different times.

In general, each of the touch sensing circuit elements may be either a multi-function circuit element that can form part of the touch circuitry and can perform one or more other functions, such as forming part of the display circuitry, or may be a single-function circuit element that can operate as touch circuitry only. Similarly, each of the display circuit elements may be either a multi-function circuit element that can operate as display circuitry and perform one or more other functions, such as operating as touch circuitry, or may be a single-function circuit element that can operate as display circuitry only. Therefore, in some examples, some of the circuit elements in the display pixel stackups can be multi-function circuit elements and other circuit elements may be single-function circuit elements. In other examples, all of the circuit elements of the display pixel stackups may be single-function circuit elements.

Note that one or more of the functions described herein can be performed by firmware stored in memory (e.g., one of the peripherals 204 in FIG. 2) and executed by panel processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 3A:
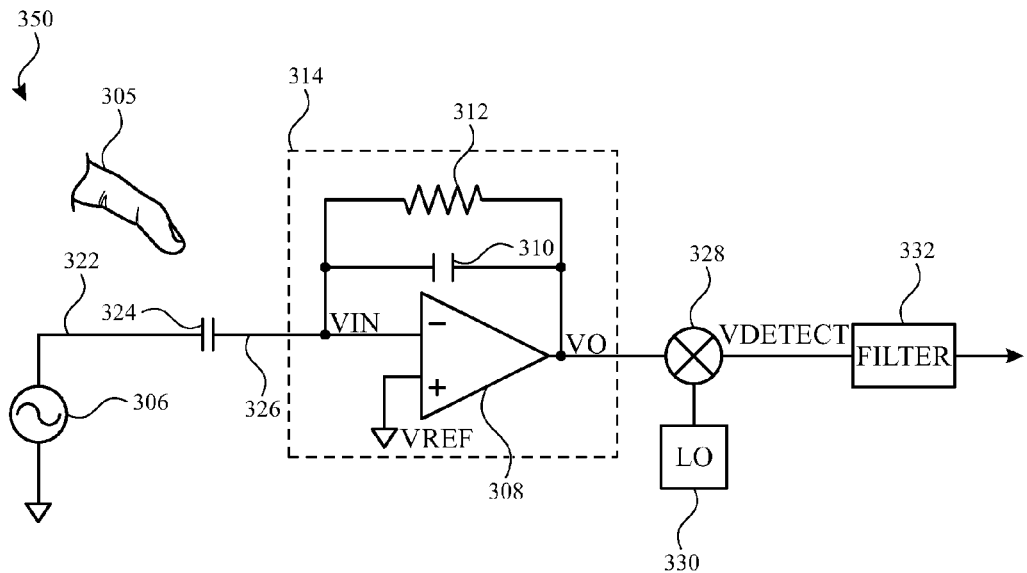
FIG. 3A illustrates an exemplary touch sensor circuit corresponding to a mutual-capacitance drive and sense line and sensing circuit according to examples of the disclosure.

FIG. 3A illustrates an exemplary touch sensor circuit 350 corresponding to a mutual-capacitance drive 322 and sense 326 electrode and sensing circuit 314 according to examples of the disclosure. Drive electrode 322 can be stimulated by stimulation signal 306 (e.g., an AC voltage signal). Stimulation signal 306 can be capacitively coupled to sense electrode 326 through mutual capacitance 324 between drive electrode 322 and the sense electrode. When a finger or object 305 approaches the touch node created by the intersection of drive electrode 322 and sense electrode 326, mutual capacitance 324 can be altered. This change in mutual capacitance 324 can be detected to indicate a touch or proximity event at the touch node, as described previously and below. The sense signal coupled onto sense electrode 326 can be received by sensing circuit 314. Sensing circuit 314 can include operational amplifier 308 and at least one of a feedback resistor 312 and a feedback capacitor 310. FIG. 3A illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage Vref. Operational amplifier 308 can drive its output to voltage Vo to keep Vin equal to Vref, and can therefore maintain Vin constant or virtually grounded. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce Vdetect. Vdetect can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of Vdetect can be used to determine if a touch or proximity event has occurred.

Figure 3B:
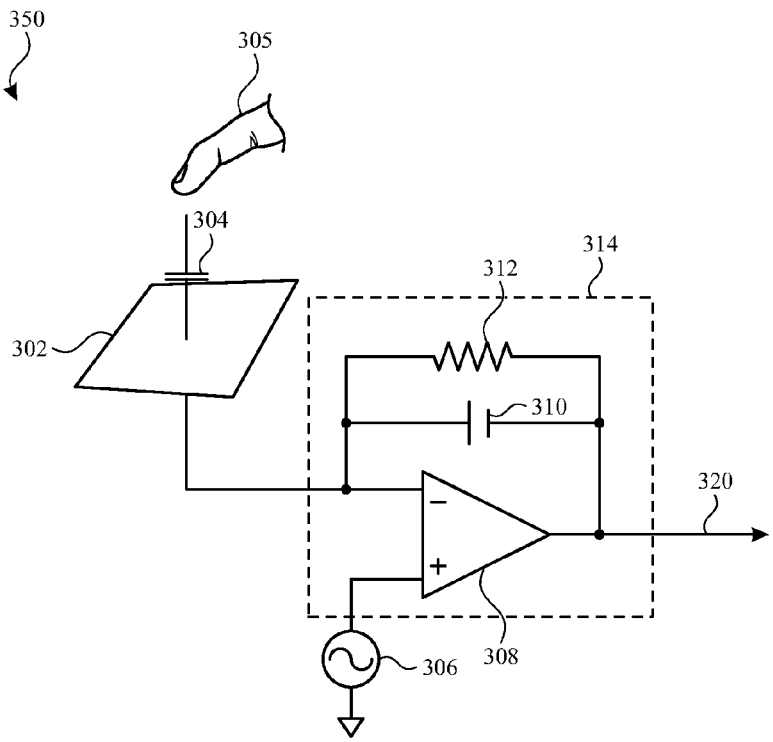
FIG. 3B illustrates an exemplary touch sensor circuit corresponding to a self-capacitance touch pixel electrode and sensing circuit according to examples of the disclosure.

FIG. 3B illustrates an exemplary touch sensor circuit 300 corresponding to a self-capacitance touch pixel electrode 302 and sensing circuit 314 according to examples of the disclosure. Touch pixel electrode 302 can have an inherent self-capacitance to ground associated with it, and also an additional self-capacitance to ground that is formed when an object, such as finger 305, is in proximity to or touching the electrode. The total self-capacitance to ground of touch pixel electrode 302 can be illustrated as capacitance 304. Touch pixel electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize any parasitic capacitance effect caused by a variable feedback resistor. Touch pixel electrode 302 can be coupled to the inverting input (−) of operational amplifier 308. An AC voltage source 306 (Vac) can be coupled to the non-inverting input (+) of operational amplifier 308. Touch sensor circuit 300 can be configured to sense changes in the total self-capacitance 304 of the touch pixel electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Although examples of the disclosure may be described herein primarily in terms of capacitive touch sensor panels and capacitive touch sensing, it should be understood that capacitive touch sensor panels are capable of detecting both touch and proximity, and therefore the term "touch" as used herein is intended to encompass both touch and proximity (hover) sensing.

Figure 4A:
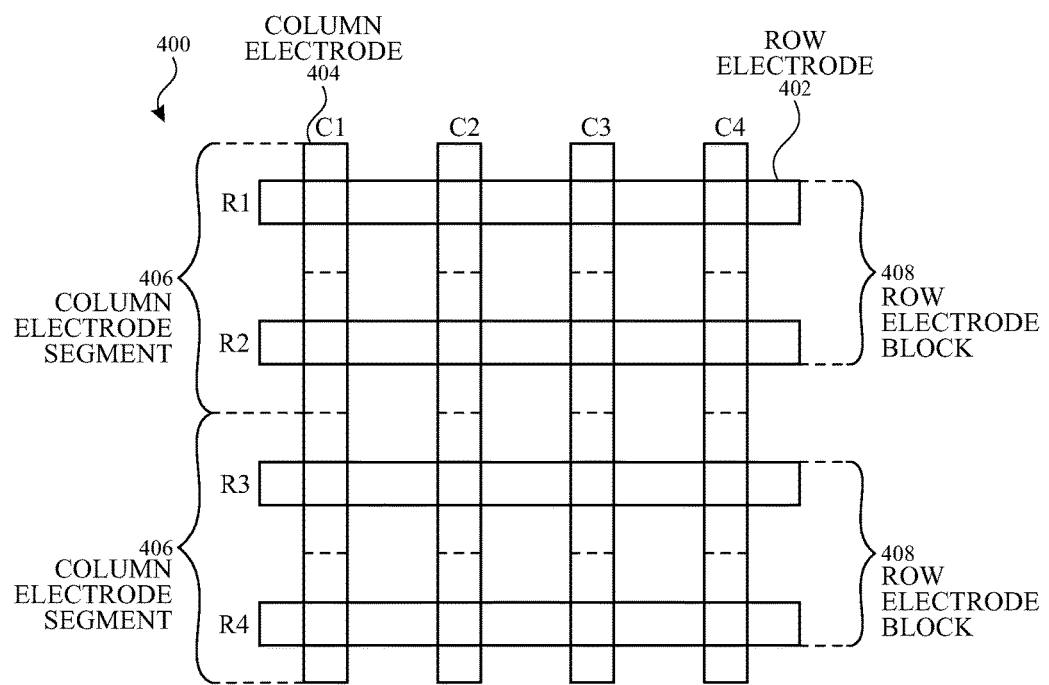
FIG. 4A conceptually illustrates the row and column electrodes of a touch sensor panel according to examples of the disclosure.

FIG. 4A conceptually illustrates the row and column electrodes 402 and 404 of a touch sensor panel 400 according to examples of the disclosure. In the example of FIG. 4A, row electrodes 402 (R1-R4) can be formed in a generally horizontal orientation, while column electrodes 404 (C1-C4) can be formed in a generally vertical orientation. Touch nodes can be formed where the row and column electrodes 402 and 404 cross each other. Row electrodes 402 can be grouped into different row electrode blocks 408, and column electrodes 404 can be formed from column electrode segments 406. In some examples, the row electrodes 402 and column electrodes 404 can be formed on different layers, and accordingly each row and column electrode can be continuously formed. In other examples, the row electrodes 402 and column electrodes 404 can be formed on the same layer, and accordingly either or both of the row electrodes or the column electrodes can be formed as separate patches.

The example touch sensor panel 400 of FIG. 4A has an aspect ratio that is typical of touch screens used as the main input mechanism for many handheld devices in that the horizontal and vertical dimensions of the touch sensor panel are not dramatically different. However, if high aspect ratio (e.g., long, thin) touch sensor panels are desired, conventional row and column electrode structures can become problematic for the reasons discussed above.

Figure 4B:
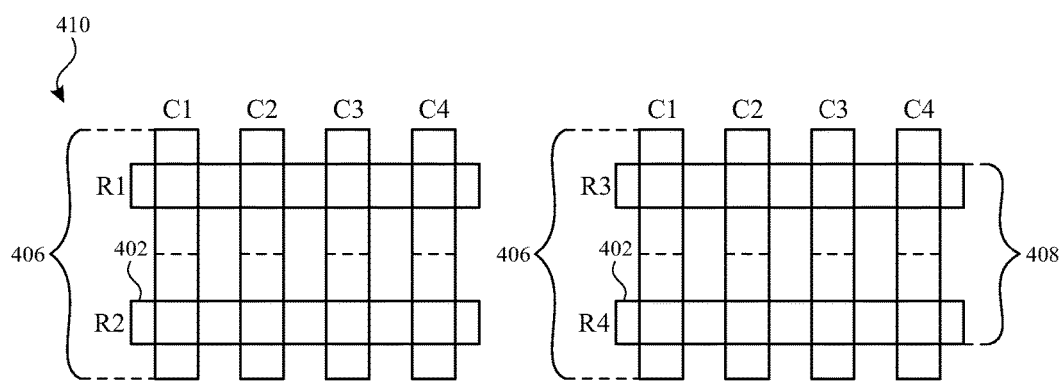
FIG. 4B conceptually illustrates the row and column electrodes of a high-aspect ratio touch sensor panel according to examples of the disclosure.

FIG. 4B conceptually illustrates the row and column electrodes of a high-aspect ratio touch sensor panel 410 according to examples of the disclosure. In the example of FIG. 4B, the row electrode blocks 408 can be separated and arranged in a first (e.g., horizontal) orientation, while the two column electrode segments 406 in each of column electrodes C1-C4 have been separated into different columns arranged in a second (e.g., vertical) orientation, although it should be understood that the row electrodes 402 and column electrode segments 406 need not be orthogonal. It should also be understood that although the example of FIG. 4B illustrates two row electrodes 402 in each row electrode block 408, and two row electrode blocks arranged horizontally, in other examples any number of row electrodes can be included in each row electrode block, and any number of row electrode blocks can be arranged horizontally. Furthermore, although the example of FIG. 4A illustrates two column electrode segments 406 in each of column electrodes C1-C4, in other examples any number of column electrode segments can form a single column electrode. The rearrangement and separation of row and column electrodes shown in the example of FIG. 4B can enable touch sensor panels of any aspect ratio to be formed.

Figure 4C:
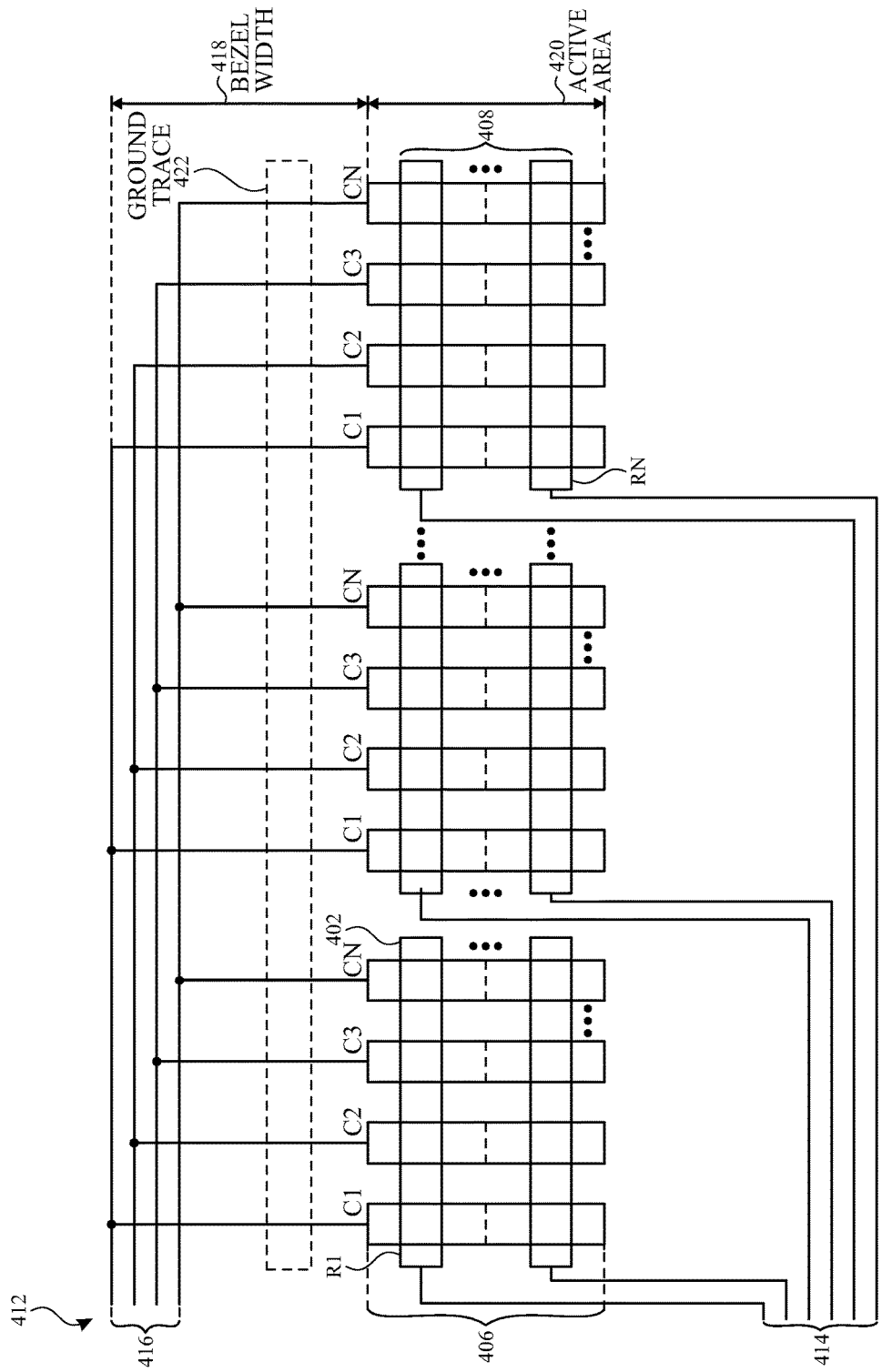
FIG. 4C illustrates the row and column electrodes of an exemplary generalized high aspect ratio touch sensor panel according to examples of the disclosure.

FIG. 4C illustrates the row and column electrodes of an exemplary generalized high aspect ratio touch sensor panel 412 according to examples of the disclosure. In the example of FIG. 4C, multiple row electrode blocks 408 can be arranged in a horizontal orientation, while a plurality of column electrode segments 406 in each of columns C1-CN can be separated into different columns. In mutual capacitance examples where the row electrodes carry stimulation signals and column electrodes carry sense signals, each row electrode 402 in each row electrode block 408 can be coupled to a touch controller or other circuitry using separate routing traces 414. In addition, each column electrode segment 406 in the same column electrode can be coupled together and coupled to a touch controller or other circuitry using separate routing traces 416. It should be understood, however, that in other mutual capacitance examples the column electrodes can carry stimulation signals and the row electrodes can carry sensor signals. In those examples, each column electrode segment 406 in the same column electrode can be coupled together and to a touch controller or other circuitry using a separate routing trace, and each row electrode 402 in each row electrode block 408 can be coupled to a touch controller or other circuitry using separate routing traces.

The sharing of a single routing trace 416 by multiple column electrode segments 406, referred to herein as bus line sharing, can produce a smaller touch sensor panel vertical dimension and a smaller bezel width 418 when these traces are routed outside the active area 420 of the touch sensor panel, which can increase the amount of real estate available to the touch sensor panel. Additionally or alternatively, the reduction in the number of routing traces 416 outside the active area 420 due to the use of bus line sharing can enable wider ground traces 422 to be used between the routing traces and the active area, which can reduce touch signal to noise ratios (SNR) and reduce touch error.

In some examples of the disclosure, the total number of routing traces 416 and 414 in a high aspect ratio mutual capacitance touch sensor panel where the row electrodes carry stimulation signals and the column electrodes carry sense signals can be minimized by optimizing the number of row electrode blocks 408. The total number of routing traces 416 and 414 can be expressed as follows:

$$L_T = a/n + b \times n,$$

where $L_T$ can be the total number of routing traces, a can be the number of column electrode segments 406, b can be the number of rows of electrodes 402 (e.g., b=2 in FIG. 4C), and n can be the number of row electrode blocks 408. The factor a/n in the above equation can be the number of routing traces 416 required for the column electrode segments 406, and the factor b×n can be the number of routing traces 414 required for the row electrodes 402 when applying an n-row electrode block driving scheme. As discussed above, to differentiate every touch node, every row electrode 402 of each row electrode block 404 can have a dedicated routing trace 414. A minimum $L_T$ can be found when the derivative of $L_T$ is zero, (i.e., when $L_T' = -(a/n^2) + b = 0$), which is satisfied when $n = \sqrt{a/b}$. The minimum $L_T$ can be equal to the integer value of $\sqrt{a/b}$.

The generalized high-aspect ratio touch sensor panel 412 of FIG. 4C can be utilized in dual layer implementations, such as when the row electrodes and column electrodes are formed on different layers on different substrates, or on opposite sides of the same substrate (e.g., dual-sided Indium Tin Oxide (DITO). In addition, the generalized high-aspect ratio touch sensor panel 412 of FIG. 4C can be utilized in single layer implementations, such as when the row electrodes and column electrodes are formed on the same layer on a single substrate (e.g., single-sided Indium Tin Oxide (SITO).

Figure 5A:
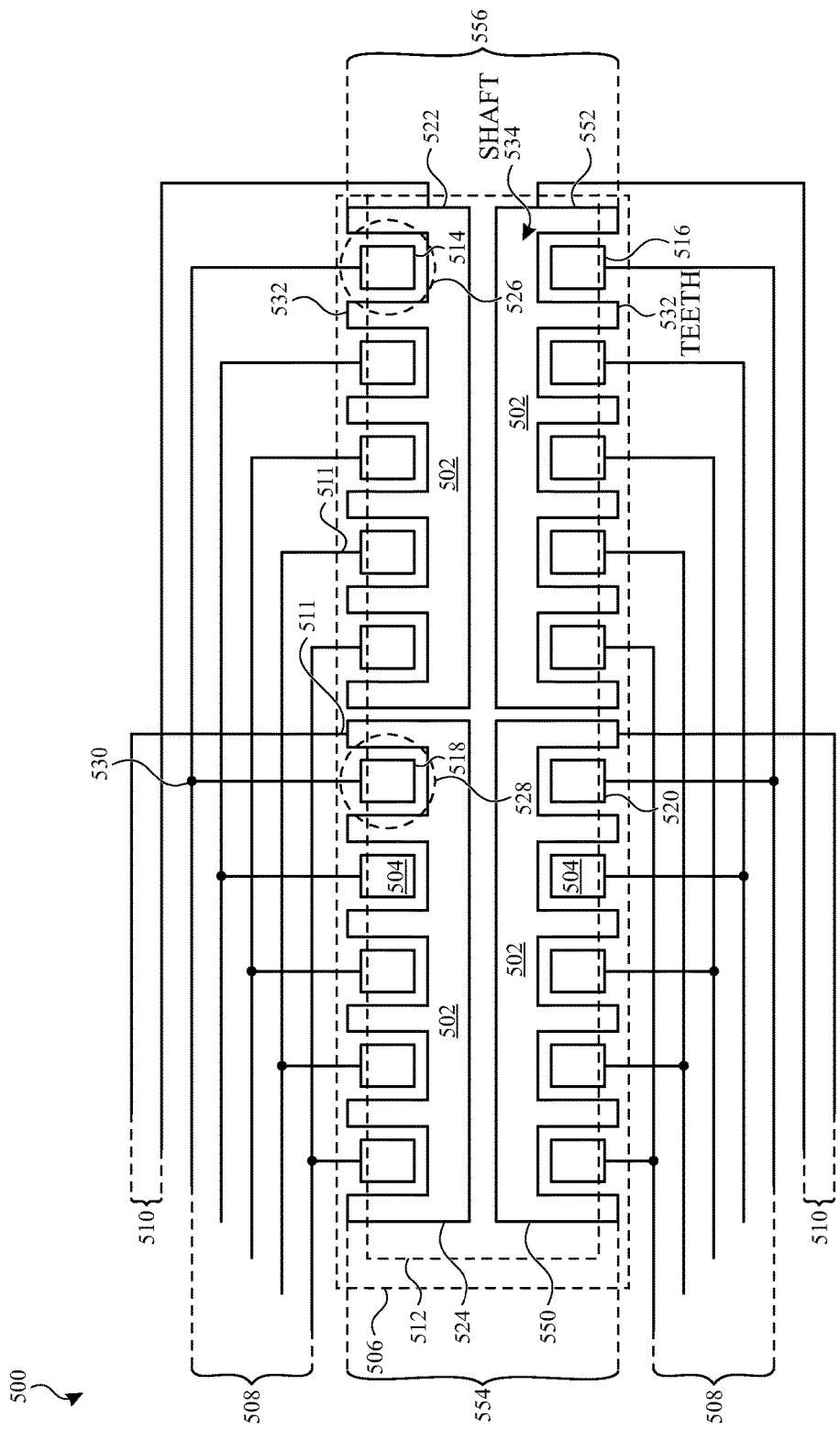
FIG. 5A illustrates an example high-aspect ratio touch sensor panel according to examples of the disclosure.

FIG. 5A illustrates an example high-aspect ratio touch sensor panel 500 according to examples of the disclosure that is similar to the example touch sensor panel of FIG. 4B. It should be noted that examples of the disclosure are not limited to rectangular high-aspect ratio touch sensor panels 500 such as that shown in FIG. 5A, but include touch sensor panels of different aspect ratios, shapes and sizes such as square touch sensor panels, circular or oval touch sensor panels, and elongated touch sensor panels having arcing or serpentine shapes, for example. In addition, it should be understood that FIG. 5A (and all of the figures that follow) are not drawn to scale, and should be considered merely representative.

The example touch panel 500 of FIG. 5A can include four row electrodes 502 formed in two rows on a first layer, though it should be understood that other numbers of row electrodes can also be employed within the two rows. Specific row electrodes 524 and 550 can form one row electrode block 554, and row electrodes 522 and 552 can form another row electrode block 556. Each row electrode 502 can be generally comb-shaped, having a shaft 534 and teeth 532 extending from the shaft, the teeth separating and at least partially surrounding a plurality of column electrode segment patches 504 also formed on the first layer. The column electrode segment patches in a single column, such as column electrode segment patches 518 and 520, can form one column electrode segment. In the example of FIG. 5A (and in other examples that follow), the teeth 532 of the row electrodes can be identical in shape and can be vertically aligned, but it should be understood that other shapes and orientations are possible.

In some examples, the row electrodes 502 and column electrode segment patches 504 can be formed from the same conductive material, such as ITO, that can be deposited in a single process step and then etched or otherwise patterned. Although the example of FIG. 5A (and other examples that follow) illustrates column electrode segment patches 504 and row electrodes 502 that follow a generally orthogonal two-dimensional orientation, it should be understood that in other examples, the orientations need not be orthogonal, and the electrodes can have different shapes, including curved and generally non-orthogonal shapes and patterns, or interleaved and interlocking patterns. In some examples, the shapes of the row and column electrodes can be optimized for a target application. For example, if more capacitive coupling between row and column electrodes is desired, then an interleaved pattern of interlocking row and column electrodes can be employed. In another example, wider and longer row and column electrodes can be utilized for long touch sensor panels that do not need high horizontal resolution.

Figure 5B:
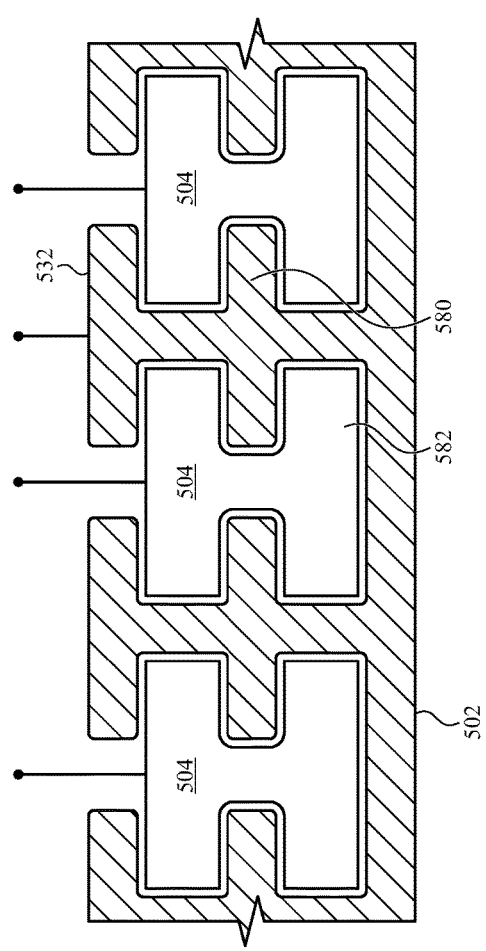
FIGS. 5B and 5C illustrate several example row electrode and column electrode segment patch portions according to examples of the disclosure.
Figure 5C:
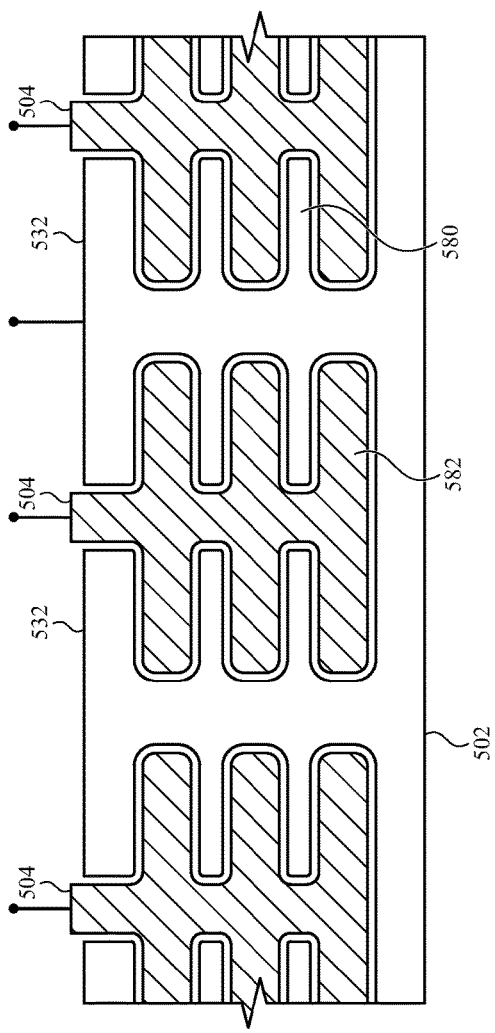

FIGS. 5B and 5C illustrate several example row electrode 502 and column electrode segment patch 504 portions that can be utilized in the example of FIG. 5A (and FIGS. 6 and 7 that follow) according to examples of the disclosure. In the examples of FIGS. 5B and 5C, the row electrode teeth 532 and the column electrode segment patches 504 can include extending arms 580 and 582, respectively, that can be formed in an interleaved or interlocking configuration. These configurations can provide more areas for electric field coupling capable of being affected by a touching or hovering object. It should be understood that FIGS. 5B and 5C are only exemplary, and other interleaved and interlocking configurations fall within the scope of examples of the disclosure.

Referring again to FIG. 5A, row electrodes 502 and column electrode segment patches 504 can be formed in an active area marked by line 506. Active area 506 can represent the area at which a touching or hovering object can be detected. Alternatively or additionally, active area 506 can represent the area of a display integrated with or underlying the touch panel 500.

Routing traces 508 can electrically couple the plurality of column electrode segment patches 504 to a touch controller (such as the touch controller shown in FIG. 2). Routing traces 510 can also electrically couple the plurality of row electrodes 502 to the touch controller. Routing traces 508 and 510 can be any conductive material electrically coupled to or continuously formed with the electrodes whose function can be to get signals to or from the electrode. Because routing traces 508 and 510 can be located in non-display areas of the touch sensor panel (i.e., outside the active area 506), the routing can be formed of lower resistance, non-transparent conductive material such as copper, and can run for longer distances and have narrower trace widths without creating excessively high line resistance. In addition, routing traces 508 and 510 can be formed on different layers and can cross over each other with insulating material in between in areas outside the active area 508 where optical uniformity may not be a concern.

Routing traces can, in some examples, have a trace width narrower than that of the coupled electrode. The difference in material properties and/or size and/or shape of the routing traces as compared to their coupled electrodes can reduce the optical uniformity of the touch sensor panel. In the example of FIG. 5A, a portion 511 of routing traces 508 and 510 can appear within the active area 506. However, because the portion 511 of routing traces 508 and 510 appearing within the active area 506 is small and can be located at the edges of the active area, any decrease in optical uniformity caused by the routing traces in the active area can be minimal. In other examples, the electrodes 502, 504 and routing traces 508, 510 can be located such that the routing is entirely outside the active area, as indicated by alternative active area 512 in FIG. 5A. In this example, routing traces 508 and 510 may not contribute to any decrease in optical uniformity.

Because all routing trace crossovers occur outside the active areas 506 or 512 in the example of FIG. 5A, there may be no need for bridges and insulating layers in the active area, and no need for necked-down row electrodes. As a result, the examples of FIG. 5A can provide one or more advantages, such as a reduction in panel thickness, physical defects, manufacturing process steps/time, cost, parasitic capacitance, structural failures during operation, or degraded touch sensing performance, while also increasing optical uniformity. In particular, the example of FIG. 5A can have much less resistance per column of column electrodes due to the absence of bridges, and it can have much less resistance per row electrode due to the absence of necked-down areas.

In some examples of the disclosure, routing traces 508 can individually couple column electrode segment patches 504 to the touch controller. In some examples, one sense channel in the touch controller may be required for each column electrode segment patch 504, though in other examples, a plurality of column electrode segment patches can be connected to a single sense channel. In some examples, one or more sense channels can be shared by the column electrode segment patches 504. In such examples, one or more multiplexers or switch arrays can be used to connect one or a plurality of the column electrode segment patches 504 to the one or more shared sense channels. In other examples, routing traces 508 can couple together column electrode segment patches in the same column electrode segment, such as column electrode segment patches 514 and 516 (although the partial routing traces 508 shown in FIG. 5A do not actually show the coupling of those electrodes), to reduce the number of routing traces required. In other examples, routing traces 508 can couple together column electrode segment patches in the same column electrode segment (e.g., column electrode segment patches 514 and 516), and additionally column electrode segment patches in one or more different column electrode segments, such as column electrode segment patches 518 and 520 in FIG. 5A, if those column electrode segments form part of the same column electrode.

Although the example of FIG. 5A illustrates routing traces 508 having connection points 530 outside the active area 506 (or alternatively 512), in other examples of the disclosure the connections can be made in a flex circuit that can couple the touch sensor panel to the touch controller, or even in the touch controller itself. By making these connections off the touch sensor panel, in some examples the routing traces 508 and 510 can be formed without crossovers in a single process step on the same layer, and then etched or otherwise patterned.

Figure 6:
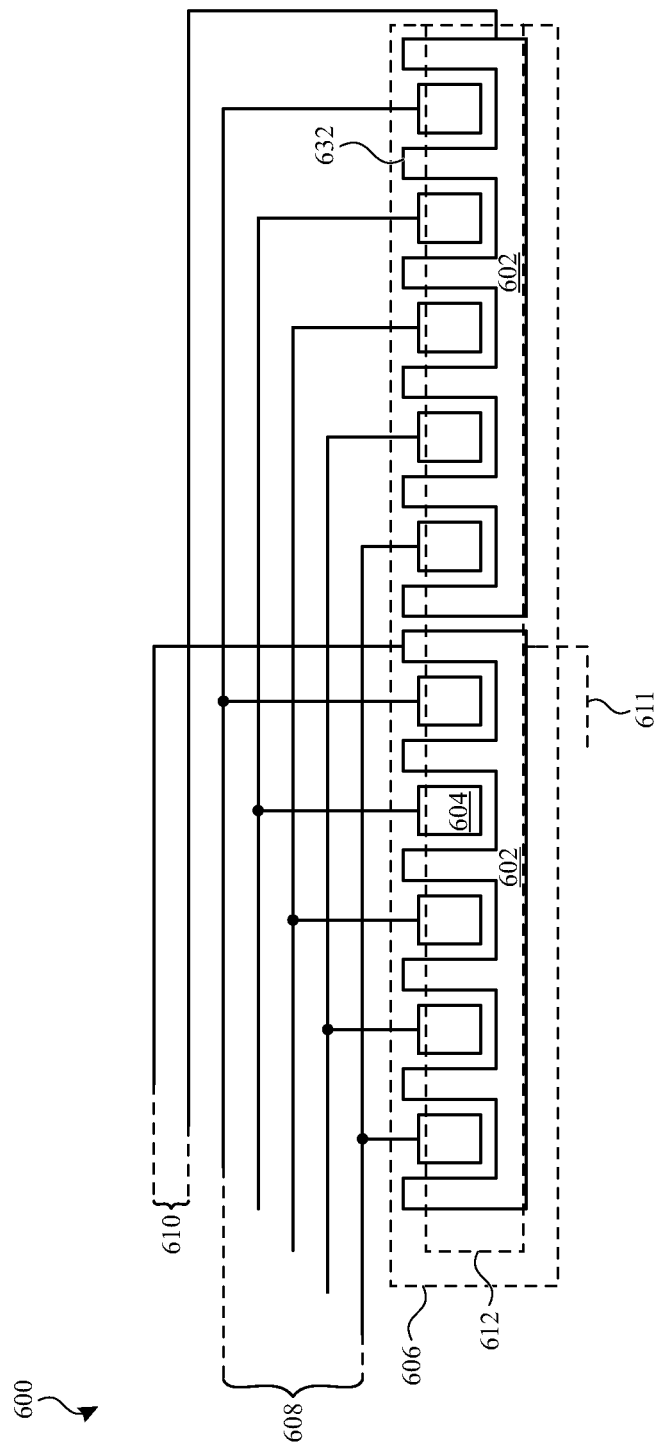
FIG. 6 illustrates another example high-aspect ratio touch sensor panel according to examples of the disclosure.

FIG. 6 illustrates another example high-aspect ratio touch sensor panel 600 according to examples of the disclosure. The example touch panel 600 of FIG. 6 can be similar to the touch sensor panel of FIG. 5A, except that the touch sensor panel of FIG. 6 can include a single row of two row electrodes 602 on a first layer in active area 606 or 612, though it should be understood that other numbers of row electrodes in the single row can also be employed. Each row electrode 602 can be generally comb-shaped, with the "teeth" of the comb 632 separating a plurality of column electrode segment patches 604 also formed on the first layer. In the example of FIG. 6, only one column electrode segment patch 604 can be formed for each column electrode segment.

Routing traces 608 can electrically couple the plurality of column electrode segment patches 604 to a touch controller. Routing traces 610 can also electrically couple the plurality of row electrodes 602 to the touch controller. In the example of FIG. 6, because of the single row of row electrodes 602, routing traces 610 can be routed without having to cross over (or under) routing traces 608 (see example alternative routing trace 611), which can reduce unintended capacitive coupling between the two. In some examples, all of the row electrodes 602 can be routed on a first side of the active area 606 or 612, and all of the column electrode segment patches 604 can be routed on a second (opposite) side of the active area. In examples wherein the column electrode segment patches 604 are not shared by a single routing trace 608, there may be no crossovers at all on the first side.

Figure 7:
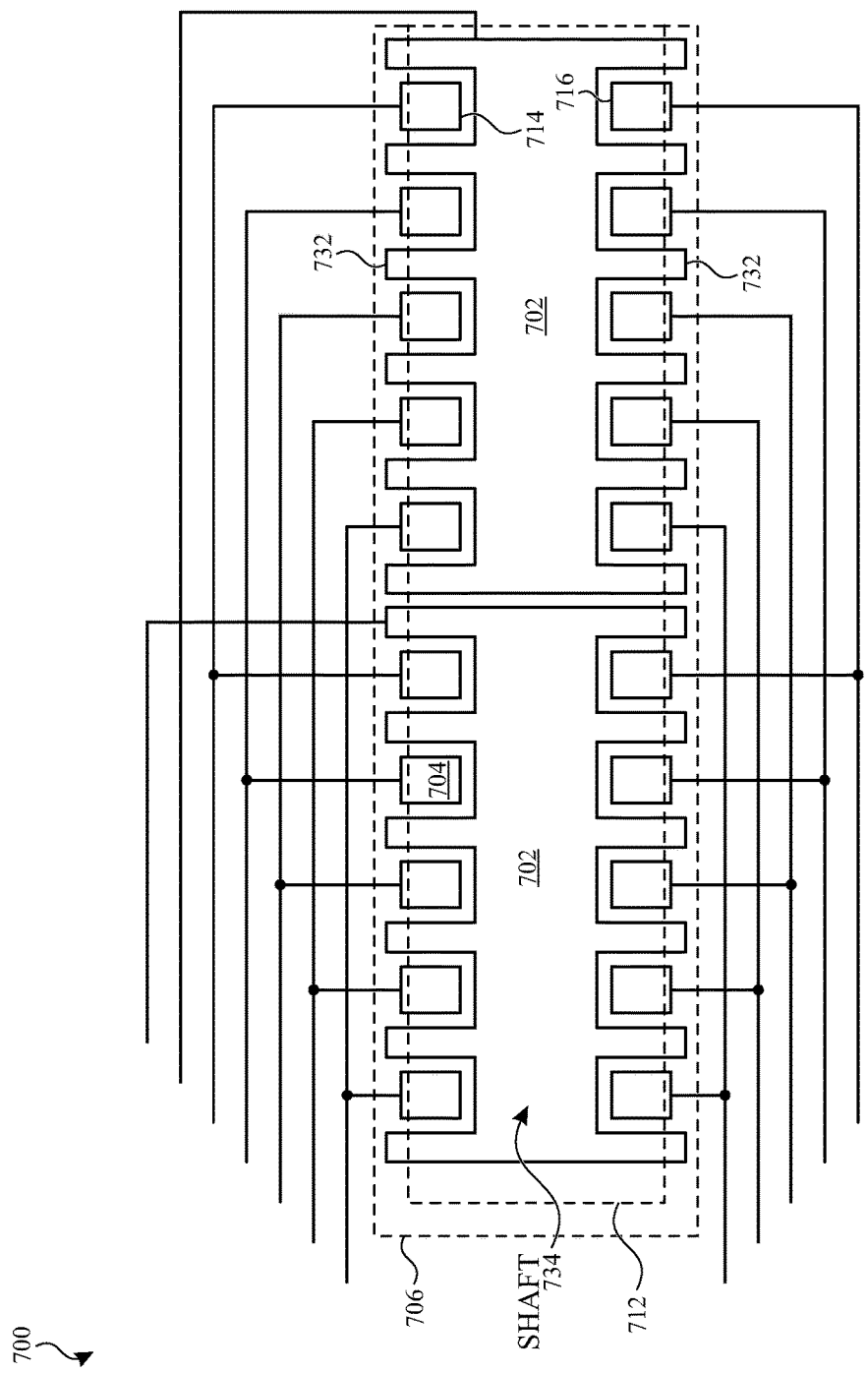
FIG. 7 illustrates another example high-aspect ratio touch sensor panel according to examples of the disclosure.

FIG. 7 illustrates another example high-aspect ratio touch sensor panel 700 according to examples of the disclosure. The example touch panel 700 of FIG. 7 can be similar to the touch sensor panel of FIG. 5A, except that the touch sensor panel of FIG. 7 combines the two rows of row electrodes into a single row on a first layer in active area 706 or 712. Each row electrode 702 can be generally comb-shaped, with the "teeth" of the comb 732 (on both sides of the shaft of the comb) separating a plurality of column electrode segment patches 704 also formed on the first layer. Because the wider combined row electrodes 702 can create a wide shaft area 734 on the comb that may be less sensitive to touch, in some examples of the disclosure the shaft area can be narrowed to a width that still provides a relatively low line resistance for the row electrodes 702. In addition, because the number of row electrodes 702 is halved in FIG. 7, in some examples the column electrode segment patches 704 in the same column electrode segment (e.g., column electrode segment patches 714 and 716) may be kept uncoupled or isolated to maintain a higher touch sensor panel resolution.

Figure 8A:
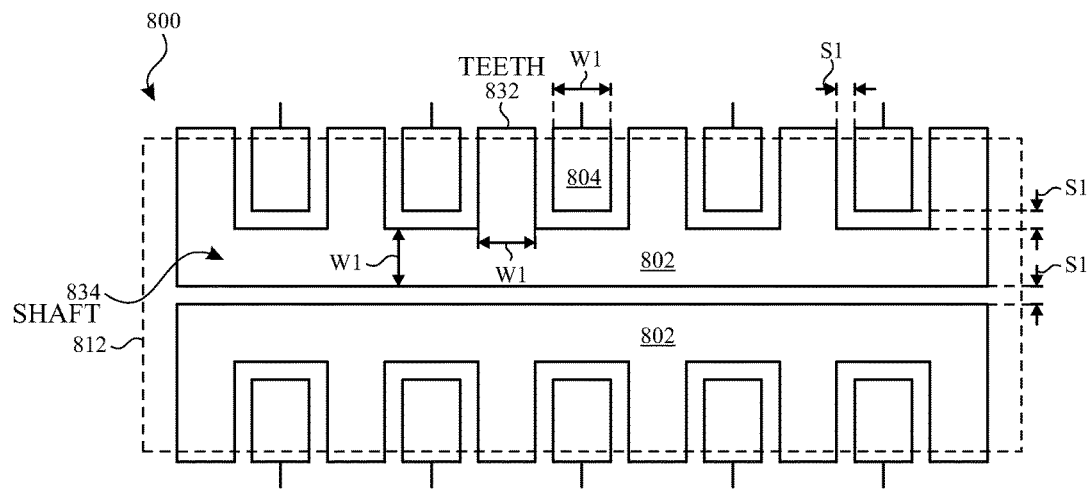
FIGS. 8A-8E illustrate other example high-aspect ratio touch sensor panels according to examples of the disclosure.

FIG. 8A illustrates another example high-aspect ratio touch sensor panel 800 according to examples of the disclosure. As discussed above, the reduction of layers according to examples of the disclosure, particularly layers with different materials or different refractive indices, can improve optical uniformity. The example of FIG. 8A can further improve optical uniformity by providing a more uniform, regular, repeating conductive layer pattern. (Note that the routing traces outside the active area 812 are not shown for purposes of simplifying the figure.) The example of FIG. 8A can be similar to one-half of the example of FIG. 5A, in that both have two rows of row electrodes and a plurality of column electrode segment patches, with two column electrode segment patches in each column electrode segment. However, in the example of FIG. 8A the widths of the teeth 832 of the row electrodes 802 and the widths of the column electrode segment patches 804 are equal, and the spacing between electrodes is the same. In particular, the width W1 of column electrode segment patches 804 can be the same as the width W1 of individual "teeth" 832 in the comb structure of row electrodes 802, and can be the same as the width W1 of the "shaft" 834 of the row electrodes 802. Additionally, the spacing S1 between adjacent row electrodes 802 and column electrode segment patches 804 can be the same as the spacing S1 between adjacent row electrodes. With uniform widths of the row electrodes 802 and column electrode segment patches 804, and uniform spacing between the row electrodes and column electrode segment patches, a more uniform, regular, repeating conductive layer and spacing pattern can be formed which may, in some instances, improve optical uniformity within active area 812. Note that in some examples, optical uniformity may be improved when spacing S1 is on the order of 20 microns, and width W1 is much greater than spacing S1. Although FIG. 8A illustrates only one row electrode 802 per row, in other examples a row can be formed from two or more row electrodes.

Figure 8B:
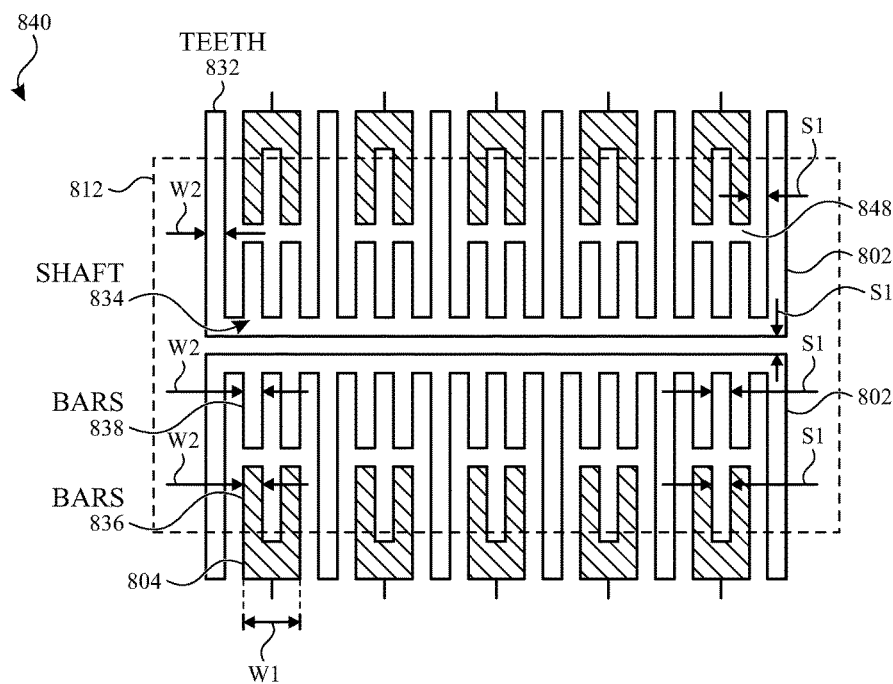

FIG. 8B illustrates another example high-aspect ratio touch sensor panel 840 according to examples of the disclosure. The example of FIG. 8B preserves the narrower width W2 of the individual teeth 832 of the comb structure of row electrodes 802 as compared to the width W1 of the column electrode segment patches 804 (i.e., the different widths of the teeth and column electrode segment patches shown in FIG. 5A). This can be accomplished by forming portions of the column electrode segment patches 804 and row electrodes 802 as a plurality of electrically connected bars 836 and 838, respectively. These bars 836 and 838 can have the same width W2 as the teeth 832 of the row electrodes 802. Additionally, the spacing S1 between bars 836, between bars 838, between row electrodes 802, and between a row electrode and a column electrode segment patch 804 can be the same. As a result, the bars 836 and 838 (with gaps 848 between them), teeth 832 and shafts 834 of the column electrode segment patches 804 and row electrodes 802, having uniform widths, can appear within active area 812. This arrangement may, in some instances, result in a more uniform, regular, repeating conductive layer and spacing pattern to improve optical uniformity within active area 812. Note that in some examples, optical uniformity may be improved when spacing S1 is on the order of 20 microns, and width W1 is much greater than spacing S1.

The bars 836 of the column electrode segment patches 804 can be continuously connected outside the active area 812 using the same layer of conductive material that forms the bars as shown in FIG. 8B, or can be electrically coupled outside the active area using different lower resistivity materials such as copper. Although FIG. 8B illustrates only one row electrode 802 per row, in other examples a row can be formed from two or more row electrodes arranged horizontally.

Figure 8C:
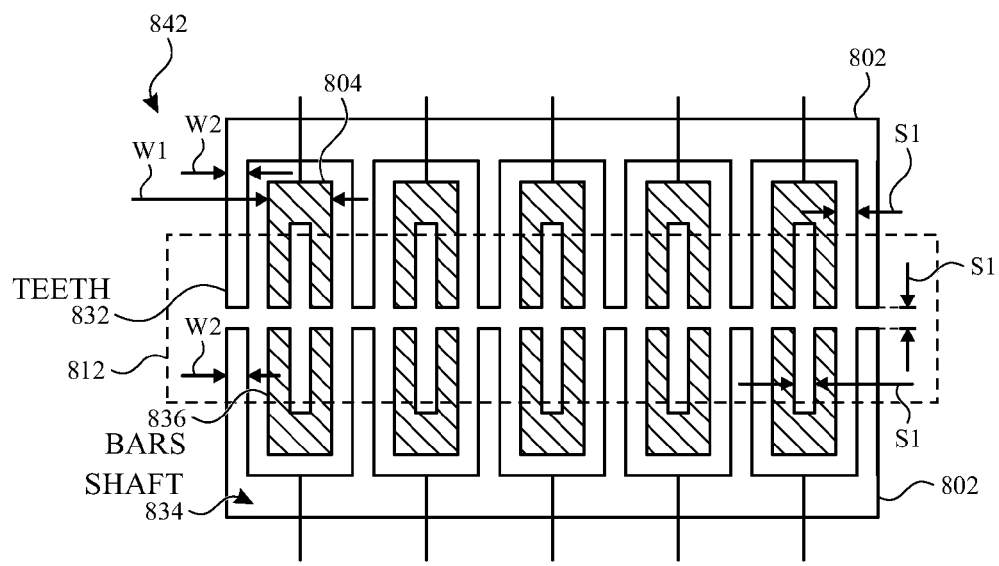

FIG. 8C illustrates another example high-aspect ratio touch sensor panel 842 according to examples of the disclosure. The example of FIG. 8C preserves the narrower width W2 of the individual teeth 832 of the comb structure of row electrodes 802 as compared to the width W1 of the column electrode segment patches 804 (i.e., the different widths of the teeth and column electrode segment patches shown in FIG. 5A). This can be accomplished by forming portions of the column electrode segment electrode patches 804 as a plurality of electrically connected bars 836. These bars 836 can have the same width W2 as the teeth 832 of the row electrodes 802. Additionally, the spacing S1 between bars 836, between row electrodes 802, between column electrode segment patches 804, and between a row electrode and a column electrode segment patches can be the same. In the example of FIG. 8C, the shafts 834 of the row electrodes 802 can be moved outside the active area 812, eliminating a pattern of horizontal conductive material from the active area 812. As a result, only the bars 836 and teeth 832 of the column electrode segment patches 804 and row electrodes 802, having uniform widths and oriented in the same direction, can appear within active area 812. This arrangement can result in a more uniform, regular, repeating conductive layer and spacing pattern that may, in some instances, improve optical uniformity within active area 812. Note that in some examples, optical uniformity may be improved when spacing S1 is on the order of 20 microns, and widths W1 and W2 are much greater than spacing S1. However, if greater vertical spacing between the column electrode segment patches 804 is desired, electrically isolated or grounded dummy bars of the same width and the same conductive material as the row electrodes 802 and column electrode segment patches (not shown in FIG. 8C) can be added between bars 836 in the same column and between teeth 832.

As discussed above, in the example of FIG. 8C, the teeth 832 of the row electrodes 802 can be continuously connected outside the active area 812 using shafts 834 formed from the same materials as the row electrodes. Because these connections can lead to unwanted capacitive coupling and detection of touches outside the active area 812, in some examples shielding such as a grounded conductive layer can be formed above these connections to isolate and shield the connecting areas from touches. In addition, in other examples these connections can be formed with non-transparent, lower resistivity materials such as copper. This can help to reduce the resistance/capacitance (RC) time constant of the sensor design and improve its bandwidth (speed). The bars 836 of the column electrode segment patches 804 can also be continuously connected outside the active area 812 using the same layer of conductive material that forms the bars, or can be electrically coupled outside the active area using different lower resistivity materials such as copper. Although FIG. 8C illustrates only one row electrode 802 per row, in other examples a row can be formed from two or more row electrodes arranged horizontally.

Figure 8D:
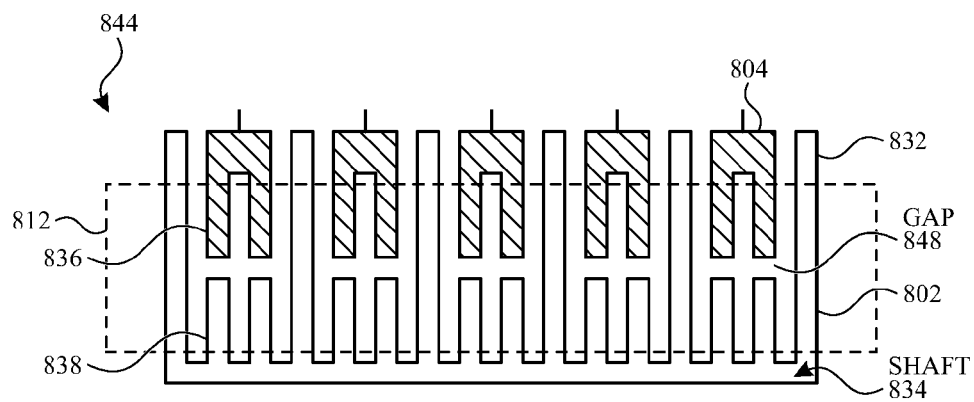

FIG. 8D illustrates another example high-aspect ratio touch sensor panel 844 according to examples of the disclosure. The example of FIG. 8D is similar to the example of FIG. 8B, except that only a single row of one or more row electrodes 802 and one column electrode segment patch 804 per column can be employed. The example of FIG. 8D can improve optical uniformity by moving the shaft 834 out of the row electrode 802 out of the active area 812, as is presented in FIG. 8B. As a result, only bars 836 and 838 (with gaps 848 between them) and teeth 832 of the column electrode segment patches 804 and row electrode 802, having uniform widths and oriented in the same direction, can appear within the active area 812. This arrangement can result in a more uniform, regular, repeating conductive layer and spacing pattern to improve optical uniformity within active area 812.

As with FIG. 8C, the bars 836 of the column electrode segment patches 804 can be continuously connected outside the active area 812 using the same layer of conductive material that forms the bars as shown in FIG. 8D, or can be electrically coupled outside the active area using different lower resistivity materials such as copper. The teeth 832 and bars 838 of the row electrode 802 can be continuously connected outside the active area 812 using the same layer of conductive material that forms the teeth and bars by placing the shaft 834 of the row electrode outside the active area as shown in FIG. 8D. Alternatively, the teeth 832 and bars 838 of the row electrode 902 can be electrically coupled outside the active area 812 using different lower resistivity materials such as copper. Although FIG. 8D illustrates a single row with only one row electrode 802, in other examples the single row can be formed from two or more row electrodes arranged horizontally.

Figure 8E:
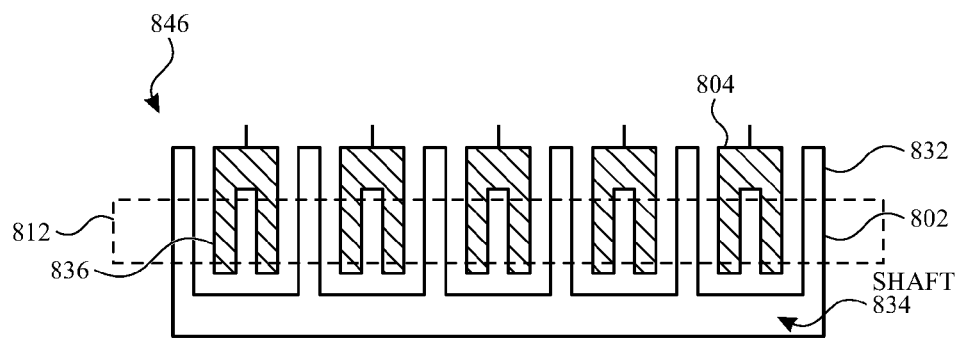

FIG. 8E illustrates another example high-aspect ratio touch sensor panel 846 according to examples of the disclosure. The example of FIG. 8E is similar to the example of FIG. 8D in that only a single row of one or more row electrodes 802 and one column electrode segment patch 804 per column can be employed. The example of FIG. 8E can improve optical uniformity by moving the shaft 834 of the row electrode 802 outside the active area 812, as is presented in FIG. 8B, and also eliminating the gaps 848 between bars 836 and 838 that are present in FIG. 8D. As a result, only bars 836 and teeth 832 of the column electrode segment patches 804 and row electrode 802, having uniform widths and oriented in the same direction, can appear within the active area 812. This arrangement can result in a more uniform, regular, repeating conductive layer and spacing pattern to improve optical uniformity within active area 812.

As with FIG. 8D, the bars 836 of the column electrode segment patches 804 can be continuously connected outside the active area 812 using the same layer of conductive material that forms the bars as shown in FIG. 8E, or can be electrically coupled outside the active area using different lower resistivity materials such as copper. The teeth 832 of the row electrode 802 can be continuously connected outside the active area 812 using the same layer of conductive material that forms the teeth by placing the shaft 834 of the row electrode outside the active area as shown in FIG. 8E. Alternatively, the teeth 832 of the row electrode 902 can be electrically coupled outside the active area 812 using different lower resistivity materials such as copper. Although FIG. 8E illustrates a single row with only one row electrode 802, in other examples the single row can be formed from two or more row electrodes arranged horizontally.

Figure 11A:
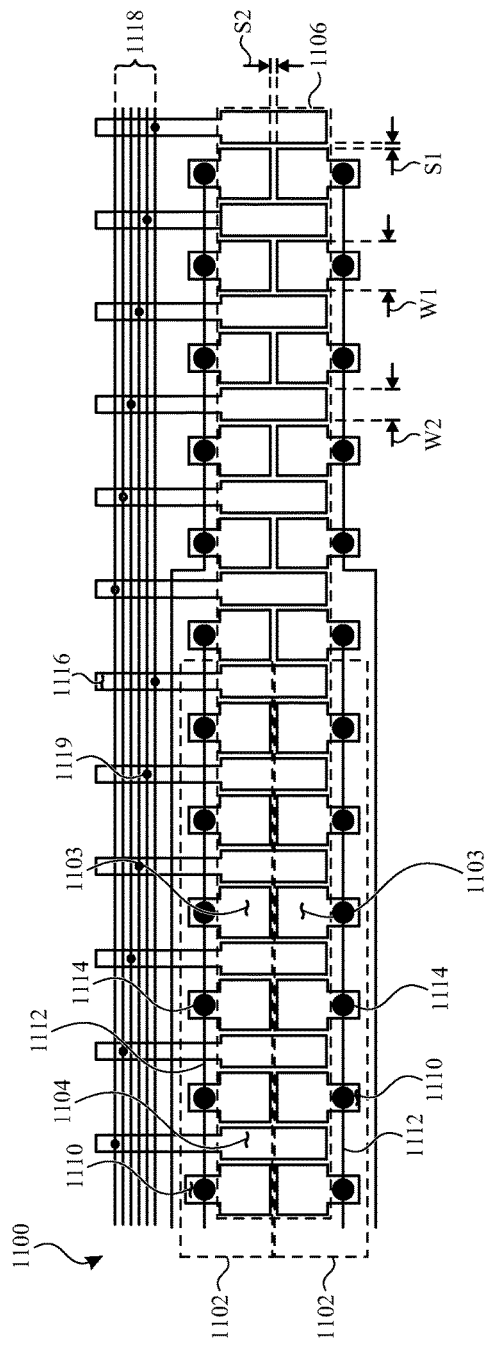
FIG. 11A illustrates another example high-aspect ratio touch sensor panel according to examples of the disclosure.

FIG. 11A illustrates another example high-aspect ratio touch sensor panel 1100 according to examples of the disclosure. The example of FIG. 11A can improve optical uniformity by providing a more uniform, regular, repeating conductive layer pattern. Additionally, the example of FIG. 11A can simplify routing and reduce the amount of routing (and/or a number of bus lines) necessary for the drive and sense electrodes. The example touch sensor panel 1100 of FIG. 11A can, like the example panel 500 of FIG. 5A, include four row electrodes 1102 formed in two rows on a first layer (e.g., in two row electrode blocks). However, unlike row electrodes 502 in FIG. 5A, which can have shaft 534 and teeth 532 extending from the shaft forming a comb-shaped electrode (e.g., a contiguous electrode formed from the same conductive material, such as ITO), row electrodes 1102 can be formed by separate row electrode patches 1103 and can be coupled together outside of active area 1106 using bus sharing techniques. Additionally, rather than forming each column electrode segment in FIG. 5A from two separate column electrode segment patches in a single column that can be then routed together (i.e. which can result in additional routing and/or bus lines), the column electrode segments 1104 can be formed without column separate column electrode segment patches (e.g., a contiguous electrode formed from the same conductive material, such as ITO). As a result, common electrode segments can be routed to bus lines without additional routing and/or bus lines. In some examples, the row electrodes patches 1103 and column electrode segments 1104 can be formed from the same conductive material, such as ITO, that can be deposited in a single process step and then etched or otherwise patterned.

The example of FIG. 11A, row electrode patches 1103 and column electrode segments 1104 can occupy the majority of active area 1106 (e.g., the display area). The widths of row electrode patches 1103 and column electrode segments 1104 can be equal and the spacing therebetween can be equal. In particular, the width of row electrode patch 1103 (W1) can be the same as the width of column electrode segment 1104 (W2). Additionally, the spacing between adjacent row electrodes patches 1103 and column electrode segments 1104 (S1) can be the same as the spacing between adjacent row electrode patches (S2). With uniform widths of the row electrode patches 1103 and column electrode segments 1104, and uniform spacing between the row electrode patches and column electrode segments, a more uniform, regular, repeating conductive layer and spacing pattern can be formed which may, in some instances, improve optical uniformity within active area 1106. In other examples, the widths of row electrode patches 1102 and column electrode segments 1104 can be different and/or the spacing between electrodes can be different.

As illustrated in FIG. 11A, row electrode patches 1103 and column electrode segments 1104 can include or be coupled to a portion of conductive material extending beyond active area 1106 ("extension portion"). The extension portion can be used to couple the sensing electrodes in the active area to bus lines. For example, row electrode extension portions 1110 can couple the corresponding row electrode patches 1103 to corresponding bus lines 1112 using corresponding vias 1114. A row electrode 1102 can be formed by coupling adjacent row electrode patches to a corresponding bus line using vias between the row electrode extension portions and the bus line for the corresponding row electrode. Similarly, column electrode extension portions 1116 can couple the corresponding column electrode segment 1104 to corresponding bus lines 1118 using corresponding vias 1119. Column electrode segments 1104 can be coupled to a shared bus line using vias 1119 between column electrode extension portions 1116 and the bus line for the corresponding column electrode. Column electrode segments coupled to a shared bus line can form a column electrode.

The extension portions 1110 and 1116 can be narrower in width than the corresponding row electrode patch or column electrode segment. The width of extension portion 1110 can be the same or different than the width of extension portion 1116. The relative length of extension portions 1110 and extension portions 1116 can be based on the location of the corresponding bus lines. It should be understood that the shape of the extension portions can be other than the shape illustrated in FIG. 11A.

As illustrated in FIG. 11A the bus lines 1118 for column electrode segments 1104 can be routed on one side of active area 1106. Routing the bus lines 1118 in such a manner can reduce cross-coupling between the row and column electrodes. In other examples, the bus lines 1118 for column electrode segments 1104 can be distributed differently with respect to the active area 1106.

Figure 11B:
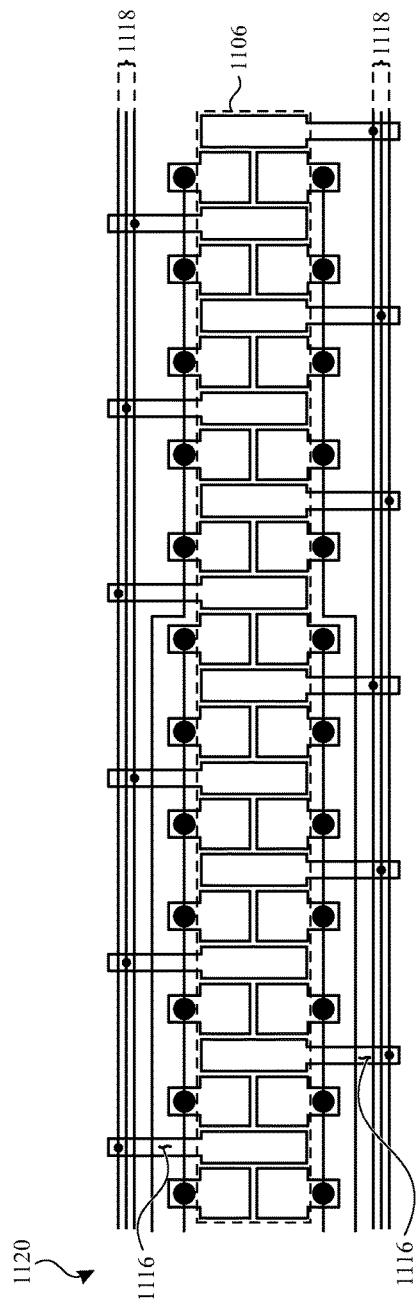
FIG. 11B illustrates another example high-aspect ratio touch sensor panel according to examples of the disclosure.

FIG. 11B illustrates another example high-aspect ratio touch sensor panel 1120 according to examples of the disclosure. The touch sensor panel 1120 can be similar to touch sensor panel 1100 of FIG. 11A. However, in FIG. 11B, bus lines 1118 can be distributed on different sides of viewing area 1106 (e.g., symmetrically or asymmetrically). In the example illustrated in FIG. 11B, half of bus lines 1118 can be distributed on a first side of active area 1106 and the other half of bus lines 1118 can be distributed on a second side of active area 1106 (i.e., symmetrically). The extension portions 1116 can extend out of active area 1106 in different directions to couple to the corresponding bus line according to the distribution of bus lines. In the example illustrated in FIG. 11B, the direction of extension for extension portions 1116 can be patterned to alternate to correspond to the alternating distribution of bus lines 1118. Symmetric distribution of the bus lines can allow for a thinner and/or symmetrical bezel area around the touch sensor panel.

The examples described above have utilized the terms "row electrodes," "row electrode blocks," "row electrode patches," "column electrodes," "column electrode segments," and "column electrode segment patches" to describe the structures that can be formed in the active area of a touch sensor panel. In some examples of the disclosure, the touch sensor panel can be used in a mutual capacitance touch sensing system, as described above. In some mutual capacitance examples, the row electrodes can be used as drive lines and the column electrodes can be used as sense lines. However in other examples, the column electrodes can be used as drive lines, and the row electrodes can be used as sense lines.

Referring again to FIG. 5A, in mutual capacitance examples wherein the column electrodes are used as sense lines and the column electrode segment patches associated with the same column electrode share the same routing trace, as with column electrode segment patches 514 and 518 in FIG. 5A, the same sense signal can appear on that routing trace regardless of whether a touch occurs at location 526 or 528, for example. To determine which location was actually touched, in some examples of the disclosure single-stim mutual capacitance sensing can be employed, where each row electrode can be stimulated at different times while the column electrodes are being sensed in parallel. This sequential stimulation of different row electrodes at different times can enable the touch controller to unambiguously determine which location on the touch sensor panel is being touched. In other examples of the disclosure, multi-stim mutual capacitance sensing can be employed, where a plurality of row electrodes can be stimulated at the same time, over multiple steps, with signals of different phases and/or frequencies that can vary at each step, while the column electrodes are being sensed in parallel. The touch controller can perform post-processing of the composite sense signals appearing on the column electrodes to unambiguously determine which location on the touch sensor panel is being touched.

In some examples of the disclosure, the touch sensor panel can be used in a self-capacitance touch sensing system, as described above. In one self-capacitance example, both the row electrodes and the column electrodes can be driven with stimulation signals and also sensed using the sense channels in the touch controller.

In self capacitance examples wherein the column electrodes are used as sense lines and the column electrode segment patches associated with the same column electrode share the same routing trace, as with column electrode segment patches 514 and 518 in FIG. 5A, the same sense signal can appear on that routing trace regardless of whether a touch occurs at location 526 or 528, for example. To determine which location was actually touched, in some examples of the disclosure the touch controller can additionally consider the sense signals appearing on the row electrodes at the same time. In the example of FIG. 5A, if the sense signal on the routing trace coupled to both column electrode segment patches 514 and 518 appears to indicate a touch, the sense signals on the routing traces coupled to row electrodes 522 and 524 can be evaluated. If, for example, a touch is indicated at both column electrode segment patches 514 and 518 and also on row electrode 524 (but not on row electrode 522), it can be determined that a touch is present at location 528, but not location 526.

Figure 9A:
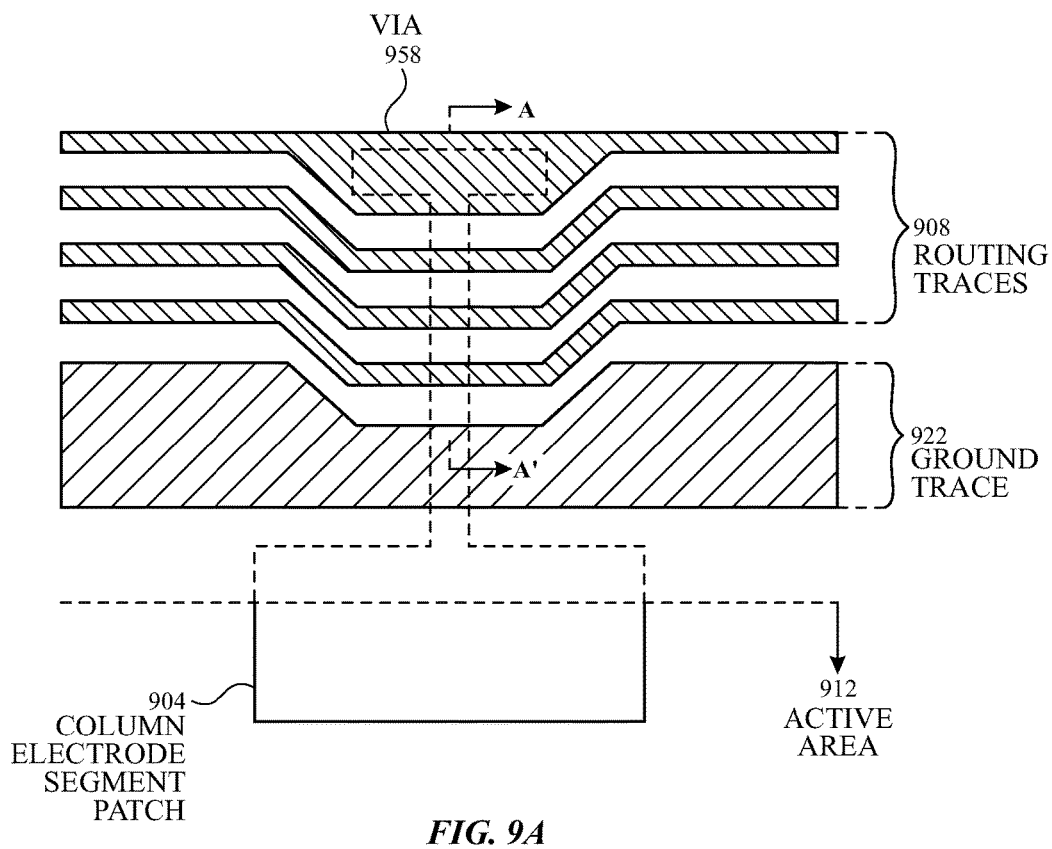
FIG. 9A illustrates a top view of an example coupling of a column electrode segment patch to a routing trace according to examples of the disclosure.

FIG. 9A illustrates a top view of an example coupling of a column electrode segment patch to a routing trace according to examples of the disclosure. As discussed with respect to FIG. 5A, column electrode segment patches can be coupled to routing traces 508 using connection points 530 outside the active area 506 or 512. In some examples of the disclosure, connection points 530 can take the form of vias outside the active area. FIG. 9A shows active area 912, a ground trace 922, and routing traces 908 including via areas 958. It should be understood that the routing patterns, via shapes, and relative sizes shown in FIG. 9A are merely exemplary and simplified for ease of explanation. Column electrode segment patch 904 includes an area (indicated by dashed lines) that extends beyond the active area 912 and underneath the metal layer that forms the ground trace 922 and routing traces 908, but is separated from the metal layer by an insulator.

Figure 9B:
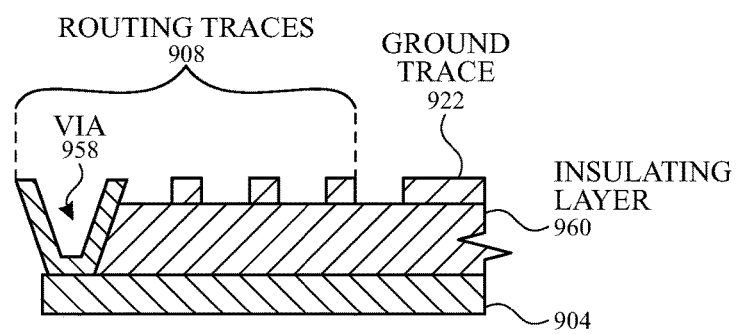
FIG. 9B illustrates a cross-sectional view of an example coupling of a column electrode segment patch to a routing trace according to examples of the disclosure.

FIG. 9B illustrates a cross-sectional view taken along line A-A' in FIG. 9A of the example coupling of a column electrode segment patch to a routing trace shown in FIG. 9A according to examples of the disclosure. In the example of FIG. 9B, the metal layer that forms the ground trace 922 and routing traces 908 extends down into a via 958 formed in insulating layer 960, where it electrically couples to column electrode segment patch 904. This connection scheme can be repeated for other connections of column electrode segment patches in the touch sensor panel.

Referring again to FIG. 5A, in some examples of the disclosure the column electrode segment patches 514 and 516 can be electrically coupled together because each of those column electrode segment patches are all part of a single column electrode segment. Although the discussion of FIG. 5A mentions that these couplings can be accomplished outside the active area of the touch sensor panels, in other examples of the disclosure these electrical couplings can be formed within the active area.

Figure 10:
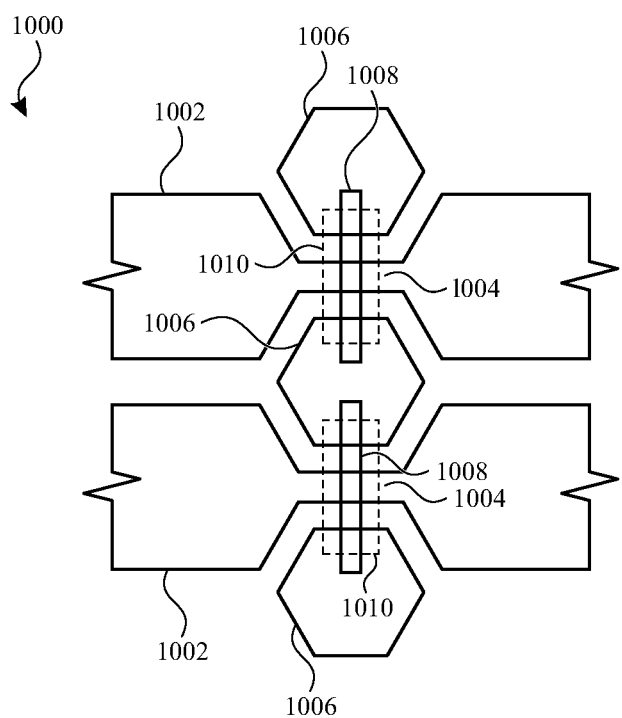
FIG. 10 illustrates an exemplary single-sided Indium Tin Oxide (SITO) touch panel portion according to examples of the disclosure.

FIG. 10 illustrates an exemplary SITO touch panel portion 1000 according to examples of the disclosure. In the example of FIG. 10, two ITO row electrodes 1002 (only a portion of which is shown in FIG. 10) can be formed on a first layer. Three ITO column electrode segment patches 1006 can also be formed on the first layer, although it should be understood that the middle patch can be optional. Conductive bridges 1008 can be formed to electrically couple the column electrode segment patches 1006 in a single column together. To avoid shorting the bridges 1008 to the row electrodes 1002, an insulating layer 1010 can be formed between the row electrodes and the bridges. In some examples, the bridges 1008 can be formed from ITO because of its transparency. However, because ITO can have a higher resistivity than other conductive materials, in other examples non-transparent materials such as copper can be used, at a cost of some optical uniformity.

The parasitic capacitance that can be formed at the area where the bridges 1008 cross over the row electrodes 1002 can make it more difficult to detect changes in the mutual capacitance between the row electrodes and column electrode segment patches caused by a touch or proximity event due to a decreased signal-to-noise ratio. To minimize this parasitic capacitance and also minimize the length of the bridges 1008, the row electrodes 1002 can be formed with necked-down areas 1004 (i.e., areas where the width of the row electrodes narrows down). Thus, the example SITO touch panel of FIG. 10 can require at least three layers in addition to a substrate: a conductive layer for the row electrodes 1002 and column electrode segment patches 1006, an insulating layer 1010, and a layer for the bridges 1008.

In some examples of the disclosure, the example touch sensor panels described herein can be used in applications that call for a high-aspect ratio touch screen. In one example, the touch sensor panels according to examples of the disclosure can be used along with a display to replace physical keys on a physical keyboard with a row of virtual keys, such as the row of function keys at the top of the keyboard. The virtual function keys can enable the number, size, markings, and functions of the function keys can be changed via software. In another example, the touch sensor panels according to examples of the disclosure can be used along with a display to provide a touch screen along a length of a stylus. In yet another example, the touch sensor panels according to examples of the disclosure can be used along with a display to provide a touch screen on one or more sides of a device, such as on the side of a mobile, tablet computer, wearable device and the like.

Therefore, according to the above, some examples of the disclosure are directed to a touch sensor panel. The touch sensor panel can comprise a plurality of first electrode blocks oriented along a first dimension of the touch sensor panel, each first electrode block including one or more first electrodes and a plurality of second electrode segments, each second electrode segment oriented along a second dimension of the touch sensor panel and forming part of one of a plurality of second electrodes. Each second electrode segment that forms part of a particular second electrode can be associated with a different first electrode block and can be configured to form at least one touch node. Additionally or alternatively to one or more of the examples disclosed above, each second electrode segment can comprise one or more second electrode segment patches. Additionally or alternatively to one or more of the examples disclosed above, the touch sensor panel can further comprise a plurality of first routing traces coupled to the plurality of second electrode segments, wherein those second electrode segments that are part of the same second electrode are coupled to the same first routing trace, and a plurality of second routing traces coupled to the first electrodes, wherein each first electrode is coupled to a different second routing trace. Additionally or alternatively to one or more of the examples disclosed above, the plurality of first routing traces and the plurality of second routing traces can be formed outside an active area of the touch sensor panel. Additionally or alternatively to the one or more examples discloses above, the plurality of first routing traces can be symmetrically distributed on opposite sides of the active area. Additionally or alternatively to one or more of the examples disclosed above, the touch sensor panel can further comprise a plurality of vias for coupling the plurality of second electrode segments to the plurality of first routing traces. Additionally or alternatively to one or more of the examples disclosed above, the first electrodes and the second electrodes can be formed on a same layer. The second electrode segments can be formed as separate patches. Additionally or alternatively to one or more of the examples disclosed above, the first electrodes and the second electrodes can be formed on different layers. Additionally or alternatively to one or more of the examples disclosed above, the one or more second electrode segment patches in a same second electrode segment can be coupled together in an active area of the touch sensor panel. Additionally or alternatively to one or more of the examples disclosed above, the one or more second electrode segment patches in a same second electrode segment can be coupled together outside an active area of the touch sensor panel. Additionally or alternatively to one or more of the examples disclosed above, the touch sensor panel can be a mutual capacitance touch sensor panel. The one or more first electrodes can be configured for carrying drive signals and the plurality of second electrodes can be configured for carrying sense signals. Additionally or alternatively to one or more of the examples disclosed above, each first electrode can comprise one or more first electrode patches. Additionally or alternatively to one or more of the examples disclosed above, the one or more first electrode patches in a same first electrode can be coupled together outside an active area of the touch sensor panel. Additionally or alternatively to one or more of the examples disclosed above, the touch sensor panel can further comprising a plurality of vias for coupling the one or more first electrode patches in the same first electrode to a routing trace. Additionally or alternatively to one or more of the examples disclosed above, the touch sensor panel can be incorporated into a computing device.

Some examples of the disclosure are directed to a touch sensor panel. The touch sensor panel can comprise one or more comb-shaped first electrodes formed in an active area on a first layer, the one or more first electrodes having a plurality of teeth, a plurality of second electrode segment patches formed in the active area on the first layer, each of the plurality of second electrode segment patches formed between two teeth of one of the first electrodes, a plurality of first routing traces formed outside the active area, each first routing trace coupled to a particular first electrode, and a plurality of second routing traces formed outside the active area and coupled to the plurality of second electrode segment patches. Additionally or alternatively to one or more of the examples disclosed above, those second electrode segment patches that form part of a particular second electrode can be coupled together outside the active area. Additionally or alternatively to one or more of the examples disclosed above, the one or more first electrodes can have a shaft from which the teeth extend. The teeth can extend in one direction from the shaft of a corresponding first electrode. The teeth and shaft of the first electrodes and the second electrode segment patches can have a same width. Additionally or alternatively to one or more of the examples disclosed above, the plurality of first routing traces and the plurality of second routing traces can be formed entirely outside the active area. Additionally or alternatively to one or more of the examples disclosed above, the one or more comb-shaped first electrodes can be configured as a combination of two first electrodes with teeth on both sides of the first electrodes. Additionally or alternatively to one or more of the examples disclosed above, the first electrodes and the second electrode segment patches can be formed as a plurality of bars. A width of the bars can be the same as a width of the teeth. Additionally or alternatively to one or more of the examples disclosed above, the one or more comb-shaped first electrodes can have a shaft from which the teeth extend. The shafts of the first electrodes can be formed outside the active area. Additionally or alternatively to one or more of the examples disclosed above, the touch sensor panel can further comprise a plurality of vias for coupling the plurality of second electrode segment patches to the plurality of second routing traces. Additionally or alternatively to one or more of the examples disclosed above, those second electrode segment patches that form part of a particular second electrode segment can be coupled together outside the active area. Additionally or alternatively to one or more of the examples disclosed above, the touch sensor panel can be a mutual capacitance touch sensor panel. The one or more first electrodes can be configured for carrying drive signals and the plurality of second electrode segment patches can be configured for carrying sense signals. Additionally or alternatively to one or more of the examples disclosed above, the touch sensor panel can be incorporated into a computing device.

Some examples of the disclosure are directed to a touch sensor panel. The touch sensor panel can comprise one or more rows of a plurality of first electrodes oriented along a first dimension of the touch sensor panel, and a plurality of second electrode segments, each second electrode segment oriented along a second dimension of the touch sensor panel and forming part of one of a plurality of second electrodes. Each second electrode segment that forms part of a particular second electrode can be associated with a different set of one or more first electrodes and can be configured to form at least one touch node. Additionally or alternatively to one or more of the examples disclosed above, each second electrode segment can comprise one or more second electrode segment patches. Additionally or alternatively to one or more of the examples disclosed above, each first electrode can comprise one or more first electrode patches. Additionally or alternatively to one or more of the examples disclosed above, the touch sensor panel can further comprise a plurality of first routing traces coupled to the plurality of second electrode segments, wherein those second electrode segments that are part of the same second electrode can be coupled to the same first routing trace, and a plurality of second routing traces coupled to the first electrodes, wherein each first electrode can be coupled to a different second routing trace. Additionally or alternatively to one or more of the examples disclosed above, the plurality of first routing traces can be symmetrically distributed on opposite sides of an active area formed by the first electrodes and second electrodes. Additionally or alternatively to one or more of the examples disclosed above, the touch sensor panel can further comprise a plurality of vias for coupling the plurality of second electrode segments to the plurality of first routing traces and the first electrodes to the plurality of second routing traces. Additionally or alternatively to one or more of the examples disclosed above, the first electrodes and plurality of second electrode segments can extend outside the active area and couple to the plurality of first routing traces and the plurality of second routing traces via the plurality of vias outside of the active area.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the appended claims.

What is claimed is:
1. A touch sensor panel comprising:
a plurality of first electrode blocks oriented along a first dimension of the touch sensor panel, each first electrode block including one or more first electrodes; and
a plurality of second electrodes formed from a plurality of second electrode segments, wherein one of the plurality of second electrodes includes a first of the plurality of second electrode segments and a second of the plurality of second electrode segments separated in the first dimension by a third of the plurality of second electrode segments forming another of the plurality of second electrodes;
wherein the first of the plurality of second electrode segments of the one of the second electrodes is associated with a first of the plurality of first electrode blocks and configured to form a first touch node, and wherein the second of the plurality of second electrode segments of the one of the second electrodes is associated with a second of the plurality of first electrode blocks and configured to form a second touch node.

2. The touch sensor panel of claim 1, further comprising:
a plurality of first routing traces coupled to the plurality of second electrode segments, wherein those second electrode segments that are part of the same second electrode are coupled to the same first routing trace; and
a plurality of second routing traces coupled to the first electrodes, wherein each first electrode is coupled to a different second routing trace.

3. The touch sensor panel of claim 2, wherein the plurality of first routing traces and the plurality of second routing traces are formed outside an active area of the touch sensor panel.

4. The touch sensor panel of claim 3, wherein the plurality of first routing traces is symmetrically distributed on opposite sides of the active area.

5. The touch sensor panel of claim 2, further comprising a plurality of vias for coupling the plurality of second electrode segments to the plurality of first routing traces.

6. The touch sensor panel of claim 1, wherein the first electrodes and the second electrodes are formed on a same layer, and wherein the second electrode segments are formed as separate patches.

7. The touch sensor panel of claim 1, wherein each second electrode segment comprises one or more second electrode segment patches.

8. The touch sensor panel of claim 7, wherein the one or more second electrode segment patches in a same second electrode segment are coupled together outside an active area of the touch sensor panel.

9. The touch sensor panel of claim 1, wherein each first electrode comprises one or more first electrode patches.

10. The touch sensor panel of claim 9, wherein the one or more first electrode patches in a same first electrode are coupled together outside an active area of the touch sensor panel.

11. The touch sensor panel of claim 10, further comprising a plurality of vias for coupling the one or more first electrode patches in the same first electrode to a routing trace.

12. A touch sensor panel comprising:
one or more comb-shaped first electrodes formed in an active area on a first layer, the one or more first electrodes having a plurality of teeth;
a plurality of second electrode segment patches formed in the active area on the first layer, each of the plurality of second electrode segment patches formed between two teeth of one of the first electrodes;
a plurality of first routing traces formed outside the active area, each first routing trace coupled to a particular first electrode; and
a plurality of second routing traces formed outside the active area and coupled to the plurality of second electrode segment patches, wherein the plurality of second routing traces includes a linear portion extending from a respective one of the plurality of second electrode segments formed between two respective teeth of the plurality of teeth, the linear portion parallel to the two respective teeth.

13. The touch sensor panel of claim 12, wherein those second electrode segment patches that form part of a particular second electrode are coupled together outside the active area.

14. The touch sensor panel of claim 12, the one or more first electrodes having a shaft from which the teeth extend, wherein the teeth extend in one direction from the shaft of a corresponding first electrode.

15. The touch sensor panel of claim 12, wherein the plurality of first routing traces and the plurality of second routing traces are formed entirely outside the active area.

16. The touch sensor panel of claim 12, wherein the one or more comb-shaped first electrodes are configured as a combination of two first electrodes with teeth on both sides of the first electrodes.

17. The touch sensor panel of claim 12, wherein the first electrodes and the second electrode segment patches are formed as a plurality of bars.

18. The touch sensor panel of claim 12, the one or more comb-shaped first electrodes having one or more shafts from which the teeth extend, and wherein the one or more shafts of the first electrodes are formed outside the active area.

19. The touch sensor panel of claim 12, further comprising a plurality of vias for coupling the plurality of second electrode segment patches to the plurality of second routing traces.

20. The touch sensor panel of claim 12, wherein those second electrode segment patches that form part of a particular second electrode segment are coupled together outside the active area.

21. A touch sensor panel comprising:
one or more rows of a plurality of first electrodes oriented along a first dimension of the touch sensor panel;
a plurality of second electrodes formed from a plurality of second electrode segments, wherein one of the plurality of second electrodes includes a first of the plurality of second electrode segments and a second of the plurality of second electrode segments separated in the first dimension by a third of the plurality of second electrode segments forming another of the plurality of second electrodes;
wherein the first of the plurality of second electrode segments of the one of the second electrodes is associated with a first of the plurality of first electrodes and configured to form a first touch node, and wherein the second of the plurality of second electrode segments of the one of the second electrodes is associated with a second of the plurality of first electrodes and configured to form a second touch node.

22. The touch sensor panel of claim 21, wherein each second electrode segment comprises one or more second electrode segment patches.

23. The touch sensor panel of claim 21, wherein each first electrode comprises one or more first electrode patches.

24. The touch sensor panel of claim 21, further comprising:
a plurality of first routing traces coupled to the plurality of second electrode segments, wherein those second electrode segments that are part of the same second electrode are coupled to the same first routing trace; and
a plurality of second routing traces coupled to the first electrodes, wherein each first electrode is coupled to a different second routing trace.

25. The touch sensor panel of claim 24, wherein the plurality of first routing traces is symmetrically distributed on opposite sides of an active area formed by the first electrodes and second electrodes.

* * * * *